US009666166B2

(12) United States Patent
Imai et al.

(10) Patent No.: US 9,666,166 B2
(45) Date of Patent: May 30, 2017

(54) INFORMATION PROCESSING APPARATUS, METHOD, AND RECORDING MEDIUM

(75) Inventors: Tomoharu Imai, Kawasaki (JP); Kazuki Matsui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 686 days.

(21) Appl. No.: 13/308,678

(22) Filed: Dec. 1, 2011

(65) Prior Publication Data

US 2012/0144397 A1 Jun. 7, 2012

(30) Foreign Application Priority Data

Dec. 2, 2010 (JP) ................................ 2010-269617

(51) Int. Cl.

*G06F 15/16* (2006.01)
*H04B 1/66* (2006.01)
*H04N 7/16* (2011.01)
*G09G 5/14* (2006.01)

(52) U.S. Cl.

CPC ........... *G09G 5/14* (2013.01); *G09G 2310/04* (2013.01); *G09G 2320/0223* (2013.01); *G09G 2320/103* (2013.01); *G09G 2330/021* (2013.01); *G09G 2340/0435* (2013.01); *G09G 2350/00* (2013.01); *G09G 2370/20* (2013.01)

(58) Field of Classification Search

CPC ............... H04L 29/08072; H04L 29/06; H04L 29/0809; H04L 29/08117; H04L 1/0003; H04L 1/0009; H04L 27/361; G06Q 30/02; H04B 1/0483; H03C 5/00; H04N 5/4401; H04N 7/17318; H04N 21/4622; H04N 21/435; H04N 21/84

USPC .......................................................... 709/219

See application file for complete search history.

(56) References Cited

U.S. PATENT DOCUMENTS

| | | | | |
|---|---|---|---|---|
| 2004/0151390 | A1* | 8/2004 | Iwamura ............... | G06F 3/1462 382/236 |
| 2006/0155735 | A1* | 7/2006 | Traut et al. ................... | 707/101 |
| 2008/0239414 | A1* | 10/2008 | Misu ............................ | 358/498 |
| 2010/0322523 | A1* | 12/2010 | Mitsuhashi et al. .......... | 382/218 |
| 2012/0184227 | A1* | 7/2012 | Saito ..................... | H04L 1/0019 455/102 |

FOREIGN PATENT DOCUMENTS

| | | |
|---|---|---|
| JP | 11-275532 | 10/1999 |

* cited by examiner

*Primary Examiner* — Mahran Abu Roumi

(74) *Attorney, Agent, or Firm* — Oblon, McClelland, Maier & Neustadt, L.L.P.

(57) ABSTRACT

An information processing apparatus includes, a storage unit that stores an image to be transmitted, an update-frequency setter that sets, for respective sections set in the image to be transmitted, update frequencies of images stored for the sections in a predetermined period of time, an association-degree setter that sets association degrees to indicate degrees of association between the sections based on the update frequencies, a priority setter that identifies the section on which an operation is performed and sets a higher priority for the identified section and the section having a highest degree of association with the identified section than priorities for other sections, and a transmitter that transmits the image, stored by the storage unit, in sequence with the images stored for the sections whose set priority is higher first.

11 Claims, 30 Drawing Sheets

FIG. 10

T1

| TIME | UPDATE FREQUENCY INFORMATION | MOUSE-CURSOR POSITION (x, y) |
|---|---|---|
| 10:10:10 | 0,0,30,40,3 | 600,300 |
| 10:10:11 | • • • | • • • |
| 10:10:12 | • • • | • • • |
| 10:10:13 | • • • | • • • |
| 10:10:14 | • • • | • • • |

FIG. 22

T7

| TIME | TOOL OPERATION STATE | SECTION |
|---|---|---|
| 10:10:10 | x | - |
| 10:10:11 | O | C1 |
| 10:10:12 | x | - |
| 10:10:13 | x | - |

FIG. 25

T8

| TIME | SECTION | | | | MOUSE POSITION (x, y) |
|---|---|---|---|---|---|
| | A1 | B1 | C1 | D1 | |
| 10:10:10 | - | - | - | - | 400,300 |
| 10:10:11 | - | - | - | - | 1000,500 |
| 10:10:12 | - | - | - | - | 1000,500 |
| 10:10:13 | - | - | - | - | 300,350 |
| 10:10:14 | - | - | 2 | - | 1000,600 |

FIG. 29

T12

| | A1 | B1 | C1 | D1 |
|---|---|---|---|---|
| A1 | | 5 | 10 | 1 |
| B1 | 5 | | 3 | 15 |
| C1 | 10 | 3 | | 0 |
| D1 | 1 | 15 | 0 | |

T6

| | A | B | C | D |
|---|---|---|---|---|
| A | | 76 | 43 | 51 |
| B | 45 | | 34 | 70 |
| C | 98 | 54 | | 54 |
| D | 56 | 93 | 32 | |

INFORMATION PROCESSING APPARATUS, METHOD, AND RECORDING MEDIUM

CROSS-REFERENCE TO RELATED APPLICATIONS

This application is based upon and claims the benefit of priority of the prior Japanese Patent Application No. 2010-269617, filed on Dec. 2, 2010, the entire contents of which are incorporated herein by reference.

FIELD

The embodiments discussed herein are related to an information processing apparatus, a method, and a recording medium.

BACKGROUND

In recent years, thin client systems have been known in which a server apparatus manages resources, such as applications and files, so that functionality equipped in a client apparatus is reduced as much as possible.

In the thin client system, with a result of processing executed by the server apparatus and/or data held thereby being displayed on the client apparatus, the client behaves as if it were playing major roles of executing the processing and/or were holding the data.

One example of a method for task execution in such a client system is a method in which a server apparatus executes applications for document creation tasks, mail management tasks, and so on and a client apparatus displays results of the processing of the applications.

In recent years, in addition to such document creation tasks and mail management tasks, there have been demands for extensively applying tasks to be executed by thin client systems to, for example, high-definition-image handling tasks, such as a CAD (computer-aided design) creation tasks, and moving-image playback and edit tasks.

When a CPU (central processing unit) of a client apparatus executes a large-load task such as a CAD creation task or a moving-image-handling task, the amount of information transferred from the server apparatus to the client apparatus increases, which may delay responses to operations executed by the client apparatus. One known example of technologies for improving the response speed is a technology in which a display screen is divided into multiple blocks, a block in which the update frequency is high is detected from the blocks, and an image in the detected block is determined as a moving image and is read and transferred with high priority (e.g., Japanese Laid-open Patent Publication No. 11-275532).

SUMMARY

According to an aspect of the embodiment, an information processing apparatus includes, a storage unit that stores an image to be transmitted, an update-frequency setter that sets, for respective sections set in the image to be transmitted, update frequencies of images stored for the sections in a predetermined period of time, an association-degree setter that sets association degrees to indicate degrees of association between the sections based on the update frequencies, a priority setter that identifies the section on which an operation is performed and sets a higher priority for the identified section and the section having a highest degree of association with the identified section than priorities for other sections, and a transmitter that transmits the image, stored by the storage unit, in sequence with the images for the sections whose set priority is higher first.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates a cursor-position management table created by an association-degree setter;

FIG. 22 illustrates information held by an operation-state detector;

FIG. 25 illustrates history information held by an operation-information history accumulator;

FIG. 29 illustrates an operation of an association-degree setter in the sixth embodiment.

DESCRIPTION OF EMBODIMENTS

In the related art, there are cases in which an image desired by a user is transmitted subsequent to other images, thus taking a long time for the user to view the contents of the desired image. For example, applications for CAD and so on may display a set of multiple windows on a single monitor. The windows displayed include, for example, a window having a relatively high update frequency (e.g., a window in which data is rendered) and a window having a relatively low update frequency (e.g., a window in which operation tools are displayed). When rendering processing for the window having a high update frequency is processed with higher priority, the priority of the rendering processing for the window having a low update frequency is relatively reduced. Consequently, for example, when the user is performing, in a window in which operation tools are displayed, a mouse operation associated with a window in which moving-image data is rendered while viewing the window, a time lag may occur in movement of the mouse cursor although the moving-image data is quickly updated.

Delay in transmission of a desired image occurs not only in cases in which still images and moving images are handled, but is also common to cases in which the amount of information transmitted between a client apparatus and a server apparatus in a thin client system increases during screen update.

Embodiments of an information processing technology that is capable of reducing the amount of delay in transmission of desired images will be described below in detail with reference to the accompanying drawings.

An information processing apparatus according to an embodiment is first described and then other specific embodiments are described.

First Embodiment

Figure 1:
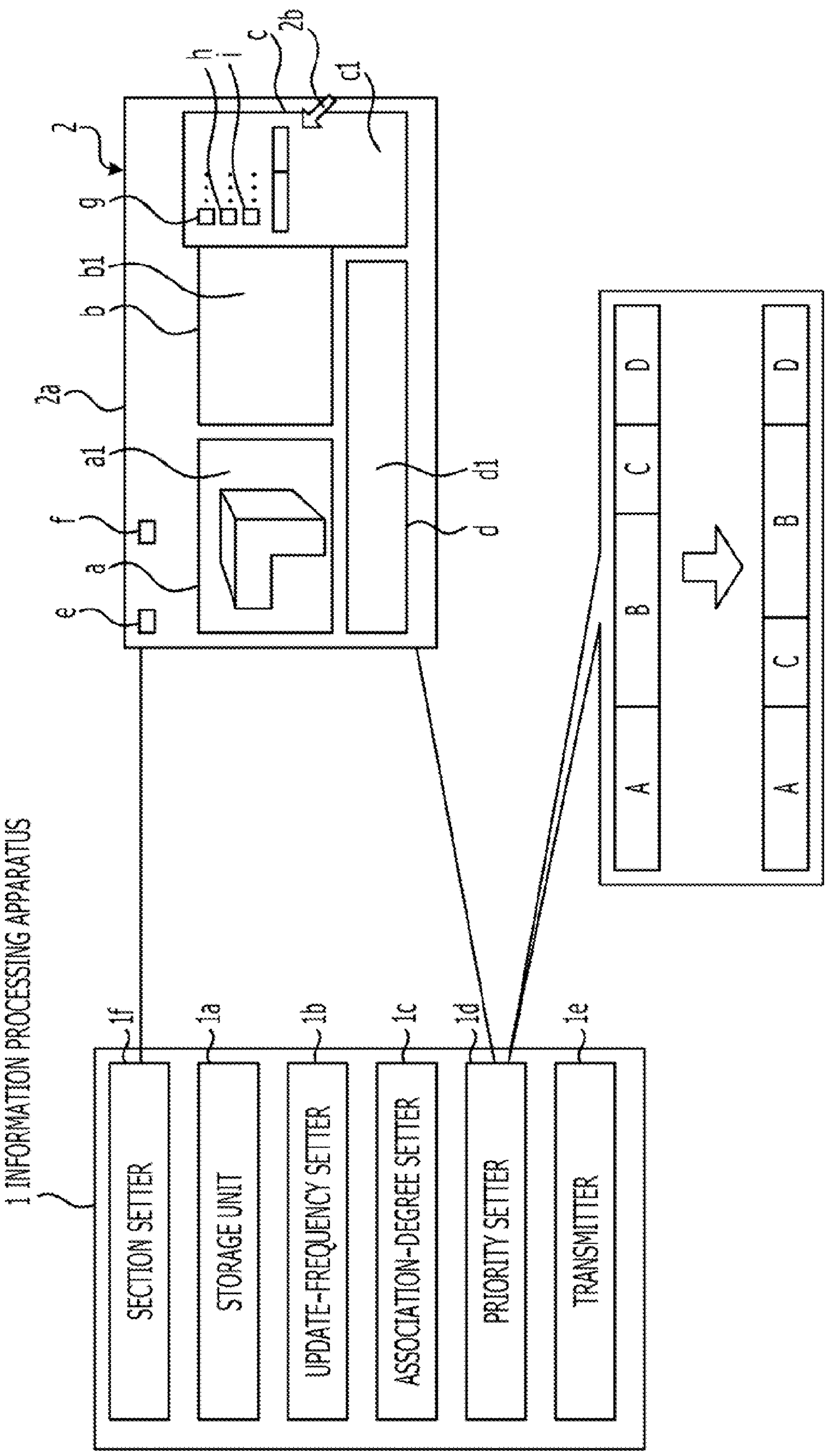
FIG. 1 is a diagram of an overview of an information processing apparatus according to a first embodiment.

FIG. 1 is a diagram of an overview of an information processing apparatus according to a first embodiment.

An information processing apparatus 1 (e.g., a computer) according to an embodiment has a function for transmitting image data to a client apparatus 2 in connection with a request for displaying an image on a display unit 2*a* of the client apparatus 2.

The information processing apparatus 1 includes a storage unit 1*a*, an update-frequency setter 1*b*, an association-degree setter 1*c*, a priority setter 1*d*, and a transmitter 1*e*.

The storage unit 1*a* stores an image to be transmitted.

The update-frequency setter 1*b* sets, for respective sections set in the image to be transmitted, update frequencies of the images stored for the sections in a predetermined period of time.

The information processing apparatus 1 according to the embodiment further includes a section setter 1*f* for setting the sections. The section setter 1*f* detects edges of each window displayed on the display unit 2*a*. In the example of FIG. 1, the section setter 1*f* detects the frames of four windows a to i as edges. On the basis of the detected edges, the section setter 1*f* sets the sections on a screen displayed on the display unit 2*a*. For example, the section setter 1*f* divides the screen into sections by using the detected edges. The section setter 1*f* then deletes the divided sections having sizes that are smaller than or equal a certain size and the sections existing inside other sections. In the example of FIG. 1, the section setter 1*f* sets the regions in the edges of the windows a to i as sections. The section setter 1*f* then deletes the sections in the edges of the windows e and f, regarding that the sizes thereof are smaller than or equal to the certain size. The section setter 1*f* also deletes the sections in the edges of the windows g, h, and i, since they exist inside the section of the window c. As a result of the processing, sections a1 to d1 of the windows a to d remain.

In the example of FIG. 1, the update-frequency setter 1*b* sets screen update frequencies for the sections a1 to d1, respectively. The update frequencies may be determined based on the amounts of data updated for the respective sections for each amount of time. More specifically, the update-frequency setter 1*b* compares given frames of an image displayed on the display unit 2*a* with each other and sets an update region in which the number of updates in the image is larger than or equal to a certain value. The update-frequency setter 1*b* then superimposes the update region on the corresponding section(s) to thereby make it possible to set a screen update frequency for each section.

On the basis of the update frequencies obtained by the update-frequency setter 1*b*, the association-degree setter 1*c* sets association degrees indicating the degrees of association between the sections. For example, the association-degree setter 1*c* refers to the update frequencies to identify the section having a highest update frequency. The association-degree setter 1*c* further sets a high association degree for the section where an update is occurring simultaneously with the identified section. In the present embodiment, a combination of the section a1 and the section c1 are assumed to have a higher association degree than combinations of the other sections.

The priority setter 1*d* identifies a section on which an operation is being performed and sets a higher priority for both the identified section and the section that is the most highly associated with the identified section than the priorities for the other sections. In the example of FIG. 1, the section in which a cursor (e.g., a mouse cursor) 2*b* is located and the section that is the most highly associated with the section in which the cursor 2*b* is located are set as a combination of the sections having the highest association degree.

The transmitter 1*e* transmits the image, stored in the storage unit 1*a*, in sequence with the images for the sections whose set priority is higher first. FIG. 1 illustrates image data A to D to be transmitted by the transmitter 1*e*. The image data A is data to be displayed in the section a1, the image data B is data to be displayed in the section b1, the image data C is data to be displayed in the section c1, and the image data D is data to be displayed in the section d1. When the priorities are not considered, the transmitter 1*e* transmits the image data A, B, C, and D to the client apparatus 2, for example, in that order. On the other hand, when the priorities are considered, the transmitter 1*e* transmits the image for the section c1 in which the mouse cursor 2*b* is located and the image for the section a1 that is the most highly associated with the section c1, prior to the images for the other sections b1 and d1. As a result, the transmitter 1*e* transmits the image data to the client apparatus 2, for example, in order of A, C, B, and D. With this arrangement, since the image for the section on which the user is actually performing an operation is transmitted prior to the images for the other sections, the amount of delay in responding to the user operation can be reduced. The client apparatus 2 receives the image data and then displays the image data in specified sections. In the example of FIG. 1, the client apparatus 2 first displays the image data A in the section a1 and displays the image data C in the section c1, and then displays the image data B in the section b1 and displays the image data D in the section d1. The processing described above makes it possible to reduce the amount of delay in the processing performed on the section c1 having a high degree of association with the section a1 having a high update frequency.

The arrangement may also be such that the association-degree setter 1*c* determines whether or not the association degrees are higher than or equal to a threshold and transmits the images for sections having association degrees that are higher than or equal to the threshold prior to the images for the other sections. With this arrangement, it is possible reduce the possibility that the images for sections having low association degrees are transmitted prior to the images for the other sections.

The update-frequency setter 1*b*, the association-degree setter 1*c*, the priority setter 1*d*, the transmitter 1*e*, and the section setter 1*f* may be realized by functions of a CPU included in the information processing apparatus 1. The storage unit 1*a* may also be realized by a data storage area in a RAM (random access memory), a HDD (hard disk drive), or the like included in the information processing apparatus 1.

The transmitter 1*e* may also transmit a large volume of data of still images, moving images, and so on to the client apparatus 2 as the image data in accordance with, for example, an RDP (remote desktop protocol) or an RFB (remote frame buffer) protocol for use in VNC (virtual network computing).

Other embodiments will be described below more specifically.

Second Embodiment

Figure 2:
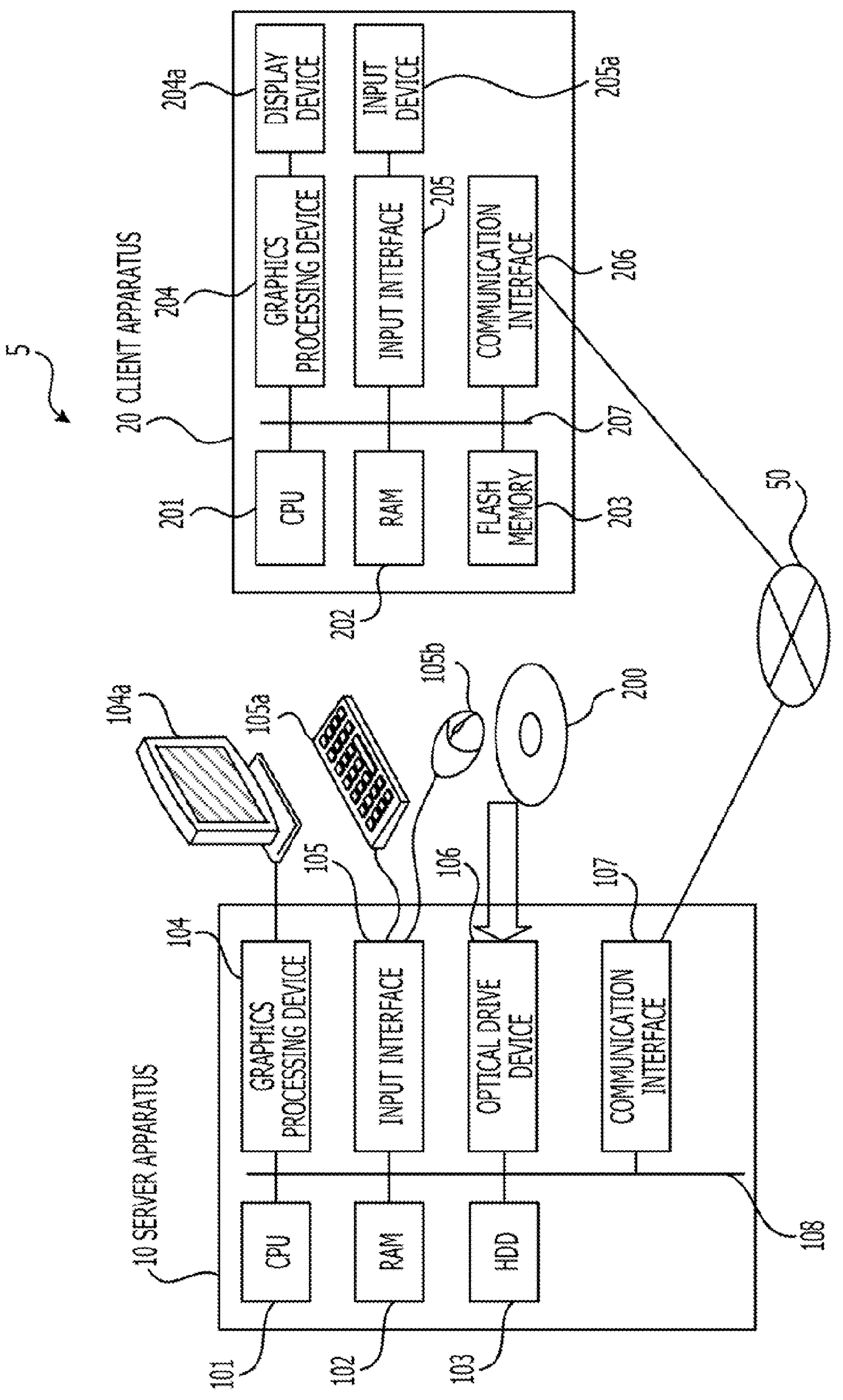
FIG. 2 is a diagram of an information processing system according to a second embodiment.

FIG. 2 is a diagram of an information processing system according to a second embodiment. An information processing system 5 according to the present embodiment has a server apparatus 10 and a client apparatus 20.

The server apparatus 10 and the client apparatus 20 are interconnected through a predetermined network 50 so as to enable mutual communication. The network 50 may be implemented by any type of communication network, such as the Internet, a LAN (local area network), or a VPN (virtual private network), regardless of whether it is wired or wireless. A description will be given of a case in which an RFB protocol for VNC is employed as one example of a protocol for communication between the server apparatus 10 and the client apparatus 20.

Although a case in which one client apparatus 20 is connected to one server apparatus 10 is illustrated in FIG. 2, two or more client apparatuses 20 may also be connected to one server apparatus 10.

The server apparatus 10 may be a computer that offers a service for remotely controlling a screen to be displayed on the client apparatus 20.

The client apparatus 20 may be a computer that receives the remote-screen control service offered by the server apparatus 10. Examples of the client apparatus 20 include mobile terminals, such as a mobile phone, a PHS (personal handyphone system) phone, and a PDA (personal digital assistant), as well as stationary terminals, such as a personal computer.

The server apparatus 10 sequentially checks a screen in a desktop environment in which an OS (operating system) and applications are running and transmits any update to the client apparatus 20. The client apparatus 20 displays screen data received from the server apparatus 10 and also transmits a command, generated by an operation, to the server apparatus 10.

A description below is given of a case in which the user operates the client apparatus 20 to receive and use the desktop-environment screen, transmitted from the server apparatus 10, over the network 50.

It is assumed that, in this case, the user uses the screen in the desktop environment and the size of a desktop screen on the server apparatus 10 and the size of a screen of the client apparatus 20 are the same. It is also assumed that, in the desktop environment, an application (e.g., a CAD application) that features having multiple child windows within one application window or using multiple windows to implement the application is used with the entire area or a large area of the screen being occupied by those windows and transmission/reception of a large amount of update data is triggered by the user's mouse operation.

Although a case in which the user operates tools such as buttons is mainly envisaged as a situation in which the information processing system 5 of the embodiments is effective, the information processing system 5 may also be advantageously applied to situations in which another user directly operates data of a three-dimensional (3D) object.

The hardware configurations of the server apparatus 10 and the client apparatus 20 will be described below. A CPU 101 controls overall operations of the server apparatus 10. A RAM 102 and peripherals are coupled to the CPU 101 through a bus 108.

The RAM 102 is used as a primary storage device for the server apparatus 10. The RAM 102 temporarily stores at least part of the OS program and application programs to be executed by the CPU 101. The RAM 102 stores various types of data used for processing to be executed by the CPU 101.

Examples of the peripherals coupled to the bus 108 include a hard disk drive (HDD) 103, a graphics processing device 104, an input interface 105, an optical drive device 106, and a communication interface 107.

The hard disk drive 103 magnetically writes/reads data to/from its built-in disk. The hard disk drive 103 is used as a secondary storage device for the server apparatus 10. The hard disk drive 103 stores the OS program, application programs, and various types of data. The secondary storage device may also be implemented by a semiconductor storage device, such as a flash memory.

A monitor 104*a* is coupled to the graphics processing device 104. In accordance with an instruction from the CPU 101, the graphics processing device 104 displays an image on a screen of the monitor 104*a*. The monitor 104*a* may be implemented by a liquid crystal display device, a display device using a CRT (cathode ray tube), or the like.

A keyboard 105*a* and a mouse 105*b* are coupled to the input interface 105. The input interface 105 sends signals, transmitted from the keyboard 105*a* and the mouse 105*b*, to the CPU 101. The mouse 105*b* is one example of a pointing device and may be implemented by another pointing device. Examples of another pointing device include a touch panel, a graphics tablet, a touchpad, and a trackball.

The optical drive device 106 uses laser light or the like to read data recorded on an optical disk 200. The optical disk 200 is a portable recording medium to which data is recorded so as to be readable via light reflection. Examples of the optical disk 200 include a Blu-Ray® disc, a DVD (Digital Versatile Disc), a DVD-RAM, a CD-ROM (Compact Disc—Read Only Memory), and a CD-R/RW (Recordable/ReWritable).

The communication interface 107 is linked to the network 50. The communication interface 107 transmits/receives data to/from the client apparatus 20 over the network 50.

A CPU 201 controls overall operations of the client apparatus 20. A RAM 202, a flash memory 203, a graphics processing device 204, an input interface 205, and a communication interface 206 are coupled to the CPU 201 through a bus 207.

The functions of the RAM 202, the graphics processing device 204, the input interface 205, and the communication interface 206 are similar to those of the RAM 102, the graphics processing device 104, the input interface 105, and the communication interface 107, respectively.

The client apparatus 20 lacks a hard disk drive and has the flash memory 203.

A display device 204*a* displays various types of information, for example, a desktop screen transmitted from the server apparatus 10. Examples of the display device 204*a* include a monitor, a display, and a touch panel. The client apparatus 20 illustrated in FIG. 2 may be a mobile terminal device that is equipped with the display device 204*a*.

An input device 205*a* receives an instruction input by the user. Examples of the input device 205*a* include a keyboard and a mouse. The display device 204*a* may realize a pointing device function in cooperation with the mouse.

Hardware configurations as described above can realize processing functions in the present embodiment.

Figure 3:
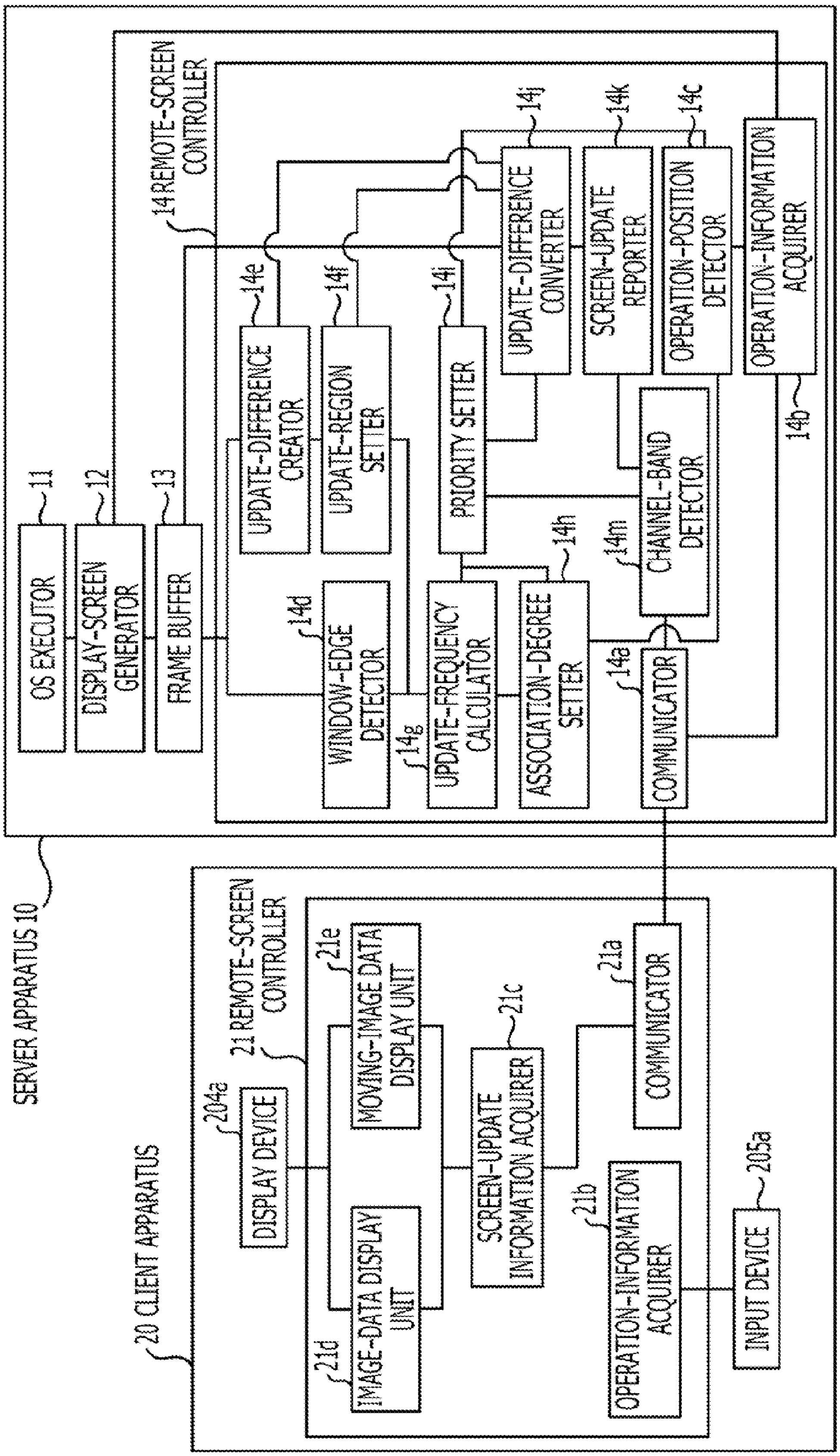
FIG. 3 is a block diagram illustrating functions of a server apparatus and a client apparatus in the second embodiment.

FIG. 3 is a block diagram illustrating functions of the server apparatus and the client apparatus in the second embodiment.

A remote-screen controlling application for a server is preinstalled or installed on the server apparatus 10. The remote-screen controlling application for a server will hereinafter be referred to as a "server-side remote-screen controlling application".

The server-side remote-screen controlling application has, as its basic function, a function for offering a remote-screen control service. As one example, the server-side remote-screen controlling application obtains information of an operation on the client apparatus 20 and causes an application running on the server apparatus 10 to perform processing requested by the operation information. The server-side remote-screen controlling application generates a screen for displaying a result of the processing executed by the application and transmits the generated screen to the client apparatus 20 over the network 50. In this case, the server-side remote-screen controlling application transmits an image of a region having pixels in a portion that has changed relative to a bitmap image that has been displayed on the client apparatus 20 before the screen is generated this time (e.g., transmits an image of an update rectangle). While a case in which an image of an update portion is a rectangular image is described below by way of example, the disclosed apparatus is also applicable to a case in which an image of an update portion has a shape other than the rectangle.

The server-side remote-screen controlling application further has a function for compressing data of a portion involving a large amount of inter-frame motion into data based on a moving-image compression system and transmitting the compressed data to the client apparatus 20. For example, the server-side remote-screen controlling application divides a screen, generated from the result of the processing executed by the application, into multiple regions and monitors update frequencies for the respective divided regions. The server-side remote-screen controlling application transmits, to the client apparatus 20, information of the update frequency of the region in which the update frequency exceeds a threshold (the region is hereinafter referred to as a "frequent-update region"). The server-side remote-screen controlling application also encodes a bitmap image of the frequent-update region into data based on an MPEG (Moving Picture Experts Group) system, such as MPEG-2 or MPEG-4, and transmits the encoded data to the client apparatus 20. Although a case in which the data is compressed into data based on the MPEG system is described by way of example, the compression system is not limited thereto. For example, the compression system may be any moving-image compression coding system, for example, Motion-JPEG (Joint Photographic Experts Group) or the like.

A remote-screen controlling application for a client is preinstalled or installed on the client apparatus 20. The remote-screen controlling application for a client will hereinafter be referred to as a "client-side remote-screen controlling application".

The client-side remote-screen controlling application has a function for reporting operation information, received via the input device 205*a*, to the server apparatus 10. Examples of the operation information reported by the client-side remote-screen controlling application include left and right clicks, double click, and drag of the mouse, as well as the position and a displacement of a mouse cursor which are obtained as a result of a movement operation of the mouse. Other examples of the operation information include the amount of rotation of a mouse wheel and the type of pressed key on the keyboard.

In addition, the client-side remote-screen controlling application has a function for causing an image, received from the server apparatus 10, to be displayed on the display device 204*a* included in the client apparatus 20. As one example, upon reception of a bitmap image for an update rectangle from the server apparatus 10, the client-side remote-screen controlling application causes the image for the update rectangle to be displayed at a position changed from the position of a previous bitmap image.

As another example, upon receiving update frequency information of a frequent-update region from the server apparatus 10, the client-side remote-screen controlling application sets, as a blank region in which no bitmap image is to be displayed, a region that lies on the display screen and that corresponds to a position included in the update frequency information. In addition, upon reception of data based on the moving-image compression system, the client-side remote-screen controlling application decodes the data and displays the decoded data in the blank region.

The functions of the server apparatus 10 and the client apparatus 20 will now be described in detail.

The server apparatus 10 includes an OS executor 11, a display-screen generator 12, a frame buffer 13, and a remote-screen controller 14. In the example of FIG. 3, in addition to the functional units illustrated in FIG. 3, the server apparatus 10 may further include various functions, such as a function of an input device and a function of a display device, of a known computer.

The OS executor 11 controls execution of the OS. For example, the OS executor 11 detects, from the operation information obtained by an operation-information acquirer 14*b* (described below), an instruction for launching an application and a command for the application. For example, upon detecting a double click on an icon associated with an application, the OS executor 11 issues, to display-screen generator 12, an instruction for launching the application associated with the icon. As another example, upon detecting an operation for requesting execution of a command on an operation screen, e.g., a window, of a running application, the OS executor 11 issues, to the display-screen generator 12, an instruction for execution of the command.

The display-screen generator 12 has a function (an application execution controlling function) for controlling execution of the application and a function (a rendering processing function) for rendering an image in the frame buffer 13 in accordance with an instruction from the OS executor 11.

For example, when the OS executor 11 issues an instruction for launching an application or when a running application is instructed to execute a command, the application execution controlling function operates the corresponding application. The application execution controlling function issues a request to the rendering processing function so as to render, in the frame buffer 13, a display image of a processing result obtained by the execution of the application. For issuing such a rendering request, the application execution controlling function notifies the rendering processing function about the display image and the rendering position of the display image. The application executed by the application execution controlling function may be preinstalled or may be installed after the shipment of the server apparatus 10. The application executed by the application execution controlling function may also be an application that runs in a network environment based on Java® or the like.

Upon receiving the rendering request from the application execution controlling function, the rendering processing function causes an image for displaying an application processing result to be rendered, in a bitmap format, at the rendering position located in the frame buffer 13 and specified by the application execution controlling function. Although a case in which the rendering request is received from the application execution controlling function has been described above, the rendering request may also be received from the OS executor 11. As one example, upon receiving a mouse-cursor rendering request from the OS executor 11, the rendering processing function may cause an image for displaying the mouse cursor to be rendered, for example, in a bitmap format, at the rendering position located in the frame buffer 13 and specified by the OS.

The frame buffer 13 stores image data rendered by the rendering processing function and used for updating the desktop (the image data will hereinafter be referred to as "update image data"). Examples of the frame buffer 13 include semiconductor memory devices, such as a RAM (e.g., a VRAM (video random access memory)), a ROM (read only memory), and a flash memory. The frame memory 13 may also be implemented by a hard disk drive or a storage device for an optical disk or the like.

The remote-screen controller 14 offers the remote-screen control service to the client apparatus 20 via the server-side remote-screen controlling application.

The remote-screen controller 14 includes a communicator **14*a*, an operation-information acquirer 14*b*, an operation-position detector 14*c*, a window-edge detector 14*d*, an update-difference creator 14*e*, an update-region setter 14*f*, an update-frequency calculator 14*g*, an association-degree setter 14*h*, a priority setter 14*i*, an update-difference converter 14*j*, a screen-update reporter 14*k*, and a channel-band detector 14*m***.

The communicator **14*a* transmits/receives data to/from the client apparatus 20 over the network 50 (not illustrated in FIG. 3**).

The operation-information acquirer **14*b* acquires operation information received from the client apparatus 20**. Examples of the operation information include left and right clicks, double click, and drag of the mouse, as well as a mouse-cursor displacement obtained as a result of a movement operation of the mouse. Other examples of the operation information include the amount of rotation of the mouse wheel and the type of pressed key on the keyboard.

The operation-position detector **14*c* has a function for detecting the current mouse-cursor position information from the user operation information transmitted from the client apparatus 20**. Examples of the position information include X and Y coordinates of a point where the mouse cursor is located).

The operation-position detector **14*c* reports the obtained mouse-cursor position information to the priority setter 14*i* and the association-degree setter 14*h***.

The window-edge detector **14*d* has a function for detecting edges from application windows and so on included in the update image data and dividing a desktop screen into multiple sections. More specifically, the window-edge detector 14*d* periodically obtains the update image data held in the frame buffer 13. Application windows running on the desktop are rendered in the update image data. In this envisaged situation, multiple windows or child windows may be displayed on the desktop. For example, since rectangular sections having various sizes, such as windows, buttons, and toolbars, are displayed on the screen, the number of sections at this point may be too large to perform processing. Thus, the window-edge detector 14*d* detects the frames of those windows as edges by using a processing scheme called "edge detection", which is an image processing technique. Using the detected edges, the window-edge detector 14*d* divides the desktop screen into multiple sections and performs processing for sorting the divided sections into sections for large windows. The processing for sorting the sections utilizes characteristics of application images rendered on the screen. The application provides buttons, toolbars, sub-windows, rendering data, and so on. The buttons, toolbars, and so on have a characteristic in that they are small and are typically surrounded by a section having a larger area. The rendering data also has a characteristic in that it is surrounded by a section having a larger area. The sub-windows have a characteristic in that each thereof has a relatively large area and is adjacent to a rectangle having a larger area. Those characteristics are utilized to perform processing for sorting small sections into large sections corresponding to the sub-windows. The window-edge detector 14*d* sends information of the divided sections to the update-frequency calculator 14*g***. The section information includes, for example, information indicating an X coordinate, a Y coordinate, a width, and a height of each section.

The update-difference creator **14*e* checks the frame buffer 13** to detect a different portion (an update difference) resulting from an update. One example of detection of the updated difference will be described below.

First, the update-difference creator **14*e* generates a screen image to be displayed on the display device 204*a* of the client apparatus 20. For example, each time the display-screen generator 12 stores bitmap data in the frame buffer 13, the update-difference creator 14*e*** starts processing as described below.

That is, the update-difference creator **14*e* compares image data displayed on the client apparatus 20 during generation of a previous frame with the update image data written in the frame buffer 13 during generation of a current frame. The update-difference creator 14***e* then generates an image of an update rectangle, which is obtained by coupling pixels in a portion that has changed from a previous frame and shaping the coupled pixels into a rectangle, and then generates plackets for transmitting the update rectangle.

The update-difference creator 14*e* then determines inter-frame update frequencies for the respective regions obtained by dividing the update image data stored in the frame buffer 13. For example, the update-difference creator 14*e* stores the generated update rectangle in an internal work memory (not illustrated) for a predetermined period of time.

In this case, the update-difference creator 14*e* also stores attribute information that allows the position and the size of the update rectangle to be specified. The attribute information includes, for example, information regarding the coordinates of an upper-left vertex of the update rectangle and the width and height of the update rectangle. The period of time in which the update rectangle is stored is correlated with the accuracy of setting a frequent-update region, and false detection of the frequent-update region decreases, as the period of time is increased. In this example, it is assumed that the image of the update rectangle is stored for one second. In this case, when the predetermined period of time passes after the image of the update rectangle is stored, the update-difference creator 14*e* determines frequencies of updates on the desktop screen by using a map having sections obtained by dividing the screen to be displayed on the display device 204*a* into blocks in a meshed pattern.

Figure 4:
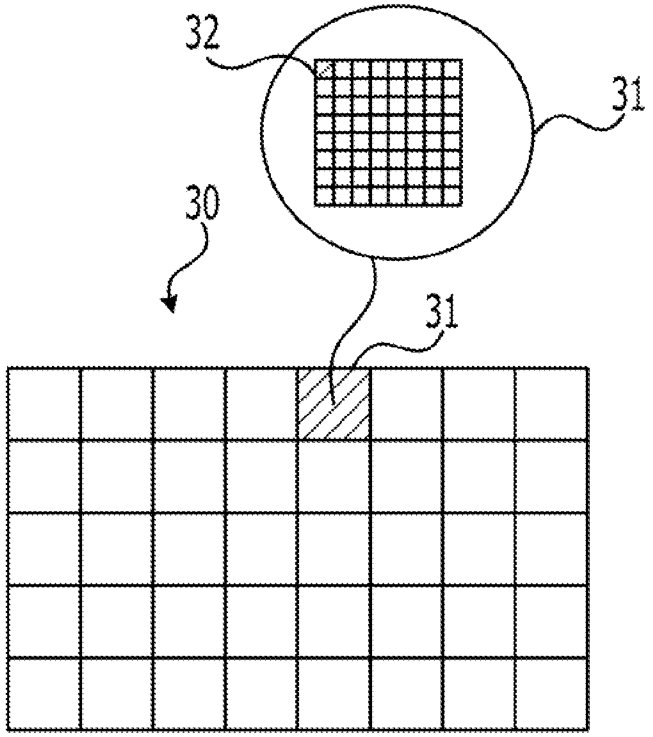
FIG. 4 illustrates how the screen to be displayed on a display device is divided.

FIG. 4 illustrates how the screen to be displayed on the display device is divided.

FIG. 4 illustrates an update-frequency determination map 30. A portion surrounded by a circle in FIG. 4 indicates details of one of blocks 31. In the example illustrated in FIG. 4, it is assumed that the update-difference creator 14*e* divides the pixels constituting the map 30 into the blocks 31, each having eight pixels×eight pixels. Thus, each block 31 includes 64 pixels 32.

In accordance with the positions and the sizes of the update rectangles accumulated in the internal work memory, the update-difference creator 14*e* sequentially deploys the images of the update rectangles onto the update-frequency determination map. Each time the update rectangle is deployed on the map, the update-difference creator 14*e* accumulates and adds up the numbers of updates in each of the block(s) 31 at a portion that overlaps the update rectangle on the map. In this case, when the update rectangle deployed on the map overlaps a predetermined number of pixels included in one block, the update-difference creator 14*e* increments the number of updates in the block by “1”. In this case, a description will be given of an example in which, when the update rectangle overlaps even one pixel included in one block, the number of updates in the block is incremented.

Figure 5A:
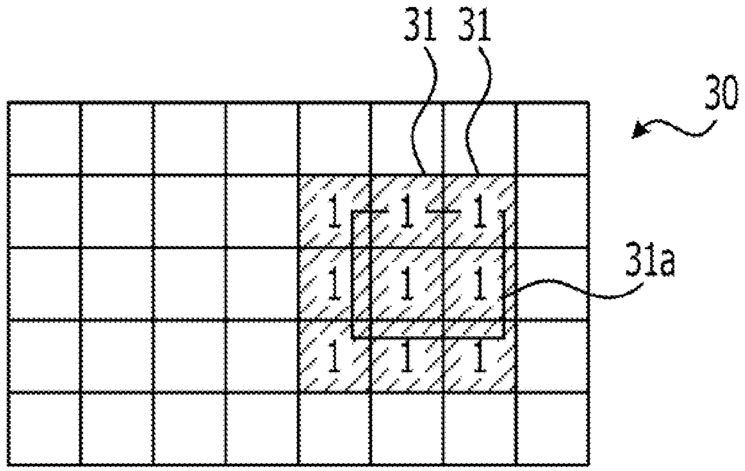
FIGS. 5A to 5C illustrate how the frequencies of updates on the screen to be displayed on the display device are determined.
Figure 5B:
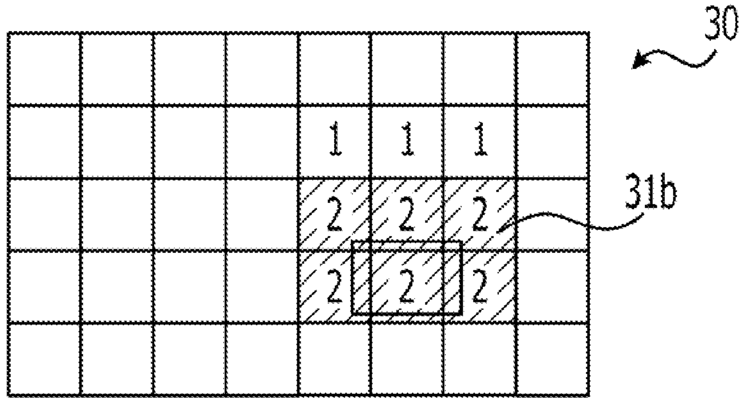
Figure 5C:
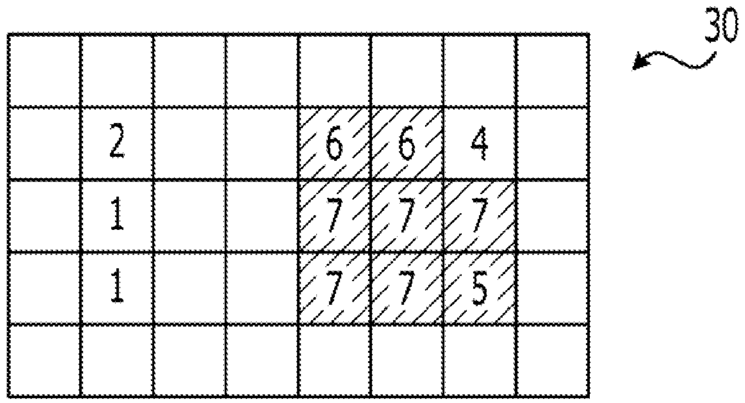

FIGS. 5A to 5C illustrate how the frequencies of updates on the screen to be displayed on the display device are determined.

Numerals indicated in nine of the blocks 31 in the update-frequency determination map 30 illustrated in FIG. 5A indicate the numbers of updates in the corresponding blocks 31 when an update rectangle 31*a* is deployed. Numerals indicated in some of the blocks 31 in the map 30 illustrated in FIG. 5B indicate the numbers of updates in the corresponding blocks 31 when an update rectangle 31*b* is deployed. Numerals indicated in some of the blocks 31 in the map 30 illustrated in FIG. 5C indicate the numbers of updates in the corresponding blocks 31 when all update rectangles accumulated in the internal work memory are deployed. In FIGS. 5A to 5C, the number of updates in each of the blocks 31 in which no numerals are indicated is assumed to be zero.

As illustrated in FIG. 5A, when the update rectangle 31*a* is deployed on the map 30, the update rectangle 31*a* overlaps the blocks 31 in a hatched portion. Thus, the update-difference creator 14*e* increments the number of updates in each of the blocks 31 in the hatched portion by “1”. In the example of FIG. 5A, since the number of updates in each block 31 has been zero, the number of updates in the hatched portion is incremented from “0” to “1”.

As illustrated in FIG. 5B, when the update rectangle 31*b* is deployed on the map 30, the update rectangle 31*b* overlaps the blocks 31 in a hatched portion. Thus, the update-difference creator 14*e* increments the number of updates in each of the blocks 31 in the hatched portion by “1”. In this case, since the number of updates in each of the blocks 31 has been “1”, the number of updates in the hatched portion is incremented from “1” to “2”.

FIG. 5C illustrates one example of the map 30 when all of update rectangles are deployed thereon.

When all of the update rectangles accumulated in the internal work memory have been deployed on the map 30, the update-difference creator 14*e* obtains the block(s) 31 in which the number(s) of updates in a predetermined period, e.g., the update frequency or update frequencies, exceeds a threshold. In the example of FIG. 5C, when the threshold is assumed to be “4”, the blocks 31 in a hatched portion are obtained. As a larger value is set for the threshold, a portion in which a moving image is more likely to be displayed on the desktop screen can be encoded by the update-difference converter 14*j*. With respect to the threshold, an end user may select one of values preset in a stepwise manner by the creator of the server-side remote-screen controlling application or may directly set a value.

A description will be given with reference back to FIG. 3.

The update-region setter 14*f* uses the update difference to set, as a frequent-update region, a region that is included in the update image data in the frame buffer 13 and that has a high update frequency.

One example of a method for setting the frequent-update region will be described below.

When the update-difference creator 14*e* obtains blocks in which the numbers of updates exceed the threshold, the update-region setter 14*f* couples adjacent ones of the blocks into a block group (which is hereinafter referred to as a “coupled block group”) and corrects the coupled block group into a rectangle. For example, the update-region setter 14*f* derives an interpolation region to be interpolated into a coupled block group and then adds the interpolation region to the coupled block group to thereby correct the coupled block group into a rectangle. The interpolation region may be derived by an algorithm for deriving a region with which a coupled block group is shaped into a rectangle with a minimum amount of interpolation therebetween.

Figure 6:
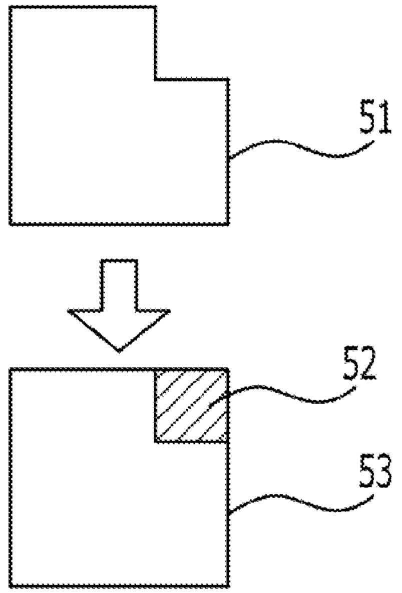
FIG. 6 illustrates how a coupled block group is corrected.

FIG. 6 illustrates how a coupled block group is corrected.

As illustrated in FIG. 6, the update-region setter 14*f* adds an interpolation region 52 to a pre-correction coupled block group 51 to thereby correct the coupled block group 51 into a rectangle 53. At this point, however, rectangle combination described below is not completed and thus the rectangle 53 has not been determined as a frequent-update region yet. Hence, the post-correction rectangle 53 is hereinafter referred to as a “frequent-update region candidate”.

When multiple frequent-update region candidates exist, the update-region setter 14*f* combines the frequent-update region candidates between which the distance is smaller than or equal to a predetermined value into a rectangle including the frequent-update region candidates. The expression "distance between the frequent-update region candidates" as used herein refers to a smallest one of the distances between the post-correction rectangles. For example, the update-region setter 14*f* derives an interpolation region to be fit into a gap between the frequent-update region candidates and adds the interpolation region to the frequent-update region candidates, to thereby combine the frequent-update region candidates into a rectangle including the candidates. The interpolation region may be derived by an algorithm for deriving a region with which frequent-update region candidates are shaped into a combination with a minimum amount of interpolation therebetween.

Figure 7:
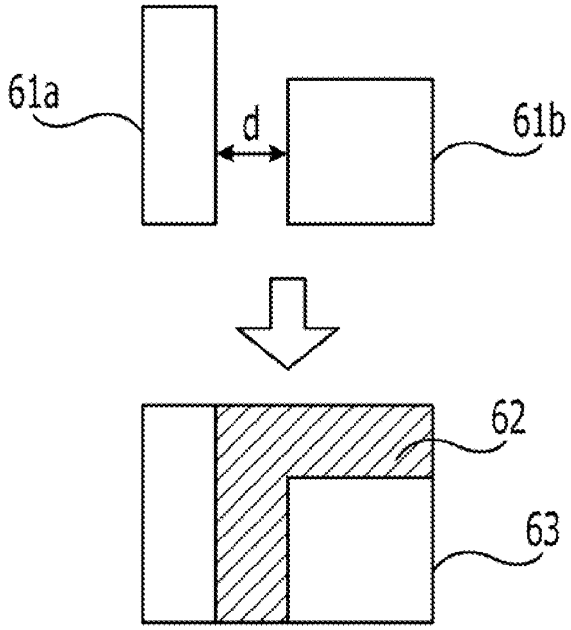
FIG. 7 illustrates how frequent-update region candidates are combined.

FIG. 7 illustrates how frequent-update region candidates are combined.

As illustrated in FIG. 7, the update-region setter 14*f* adds an interpolation region 62 to frequent-update region candidates 61*a* and 61*b* to thereby create a combination 63 including the frequent-update region candidates 61*a* and 61*b*. The update-region setter 14*f* then sets the thus-obtained combination 63 as a frequent-update region.

Upon setting the frequent-update region in the manner described above, the update-region setter 14*f* sends update frequency information to the update-frequency calculator 14*g* and the client apparatus 20. The update frequency information includes information for identifying the position and the size of the identified frequent-update region, an ID (a region identifier) for identifying the frequent-update region, and the number of updates. Upon reception of the update frequency information, a portion that is included in the image data for the desktop screen to be displayed on the client apparatus 20 and that corresponds to the frequent-update region is displayed blank. Thereafter, the update-region setter 14*f* clears the number of updates in each of the blocks mapped in the internal work memory. The update-region setter 14*f* stores the update frequency information in the internal work memory.

Figure 8A:
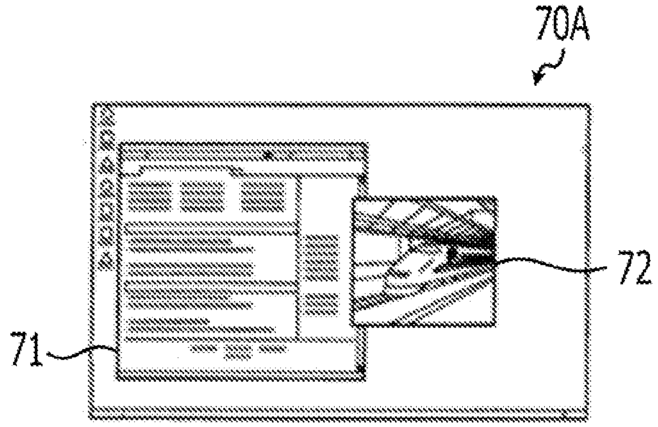
FIGS. 8A to 8C illustrate region-position identification information.
Figure 8B:
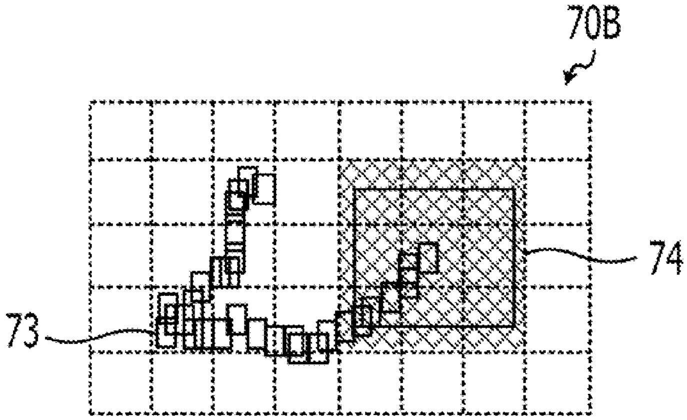
Figure 8C:
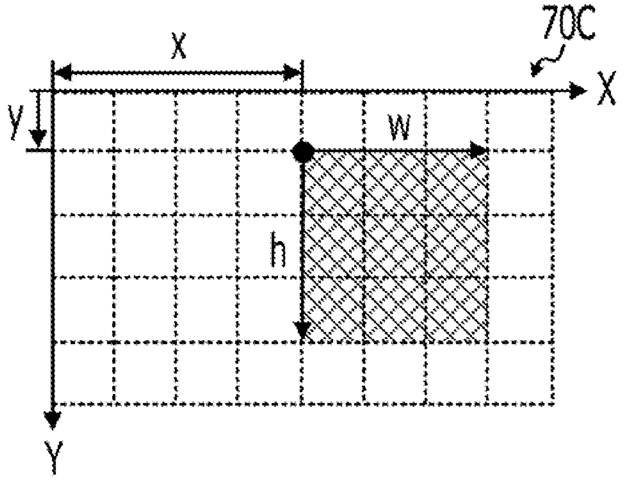

FIGS. 8A to 8C illustrate region-position identification information.

As illustrated in FIG. 8A, a desktop screen 70A realized by the update image data stored in the frame buffer 13 includes a browser screen 71 and a moving-image playback screen 72. When changes on the desktop screen 70A are kept track of time-sequentially, an update rectangle of the browser screen 71 that is a still image is not detected and a mouse movement trace 73 and an update rectangle associated with a moving-image playback region 74 based on an application are detected, as illustrated on a screen 70B in FIG. 8B.

It is assumed that the update-region setter 14*f* identifies, in the moving-image playback region 74, blocks in which the numbers of updates exceed a threshold, e.g., a portion indicated by hatching. In this case, the update-region setter 14*f* creates update frequency information by adding the largest number of updates of the numbers of updates in the regions specified by the region-position identification information, including the coordinates (x, y) of the upper-left vertex, the width w, and the height h of the frequent-update region in a hatched portion illustrated on a screen 70C in FIG. 8C, to the region-position identification information. The update-region setter 14*f* then stores the created update frequency information in the internal memory also sends it to the update-frequency calculator 14*g*.

Although a case in which the coordinates of the upper-left vertex are used to represent a point for designating the position of the frequent-update region has been described above, another vertex may also be used.

Instead of a vertex, any point, such as a barycenter, that enables designation of the position of a frequent-update region may also be used. Although a case in which the upper-left vertex on the screen is used as the original of the coordinate axes X and Y has been described above, any point in or outside the screen may be used as the origin. A description will be given with reference back to FIG. 3.

The update-frequency calculator 14*g* generates section-specific update frequency information indicating the update frequency for each section on the desktop on the basis of in-desktop section information received from the window-edge detector 14*d* and the update frequency information received from the update-region setter 14*f*.

For example, upon receiving pieces of section information "0, 0, 30, 40" and "30, 0, 60, 80" (X coordinate, Y coordinate, width, height) and pieces of update frequency information "0, 0, 16, 16, 3" and "16, 16, 16, 16, 4" (X coordinate, Y coordinate, width, height, the number of updates), the update-frequency calculator 14*g* maps the received pieces of information to the in-desktop section information and calculates the update frequency (the number of updates) for each in-desktop section to obtain "0, 0, 30, 40, 3" (X coordinate, Y coordinate, width, height, the number of updates) and so on. After the calculation, the update-frequency calculator 14*g* sends the generated section-specific update frequency information to the association-degree setter 14*h* and the priority setter 14*i*.

The association-degree setter 14*h* has a function for calculating, upon receiving the section-specific update frequency information from the update-frequency calculator 14*g* and receiving the current mouse-cursor position information from the operation-position detector 14*c*, the frequency (co-occurrence frequency) of updates occurring simultaneously in multiple sections and for setting an association degree indicating the degree of association between the sections. The reason why the association degree is set will be described below.

An application for use in CAD or the like is typically executed using the entire area or a large area of the desktop screen. In such a case, the application is constituted and used with sections including multiple windows, child widows, or the like. The sections can be broadly classified into two types of section according to their functions. A first one of the types is a section having buttons, sliders, checkboxes, and so on and is aimed to perform some type of operation on data currently created by the user. Such a section will be referred to as an "operation tool section" hereinafter. A second type is a section for displaying data, such as a 2D or 3D object or a wire frame, currently created by the user. Such a section will be referred to as a "data rendering section" hereinafter. The operation tool section is rendered by clicking/dragging a button or slider with the mouse and is generally updated at relatively short intervals. However, in the operation tool section, since the amount of data for each update is considerably small, the average amount of update data is small. On the other hand, data operated by the user is directly or indirectly rendered in the data rendering section and it is intermittently updated. However, since a vast amount of update occurs at the same time, the average amount of update data in the data rendering section is large.

Many of such applications have multiple operation tool sections and multiple data rendering sections, and the operation tool sections and the data rendering sections often have certain associations therebetween.

Figure 9:
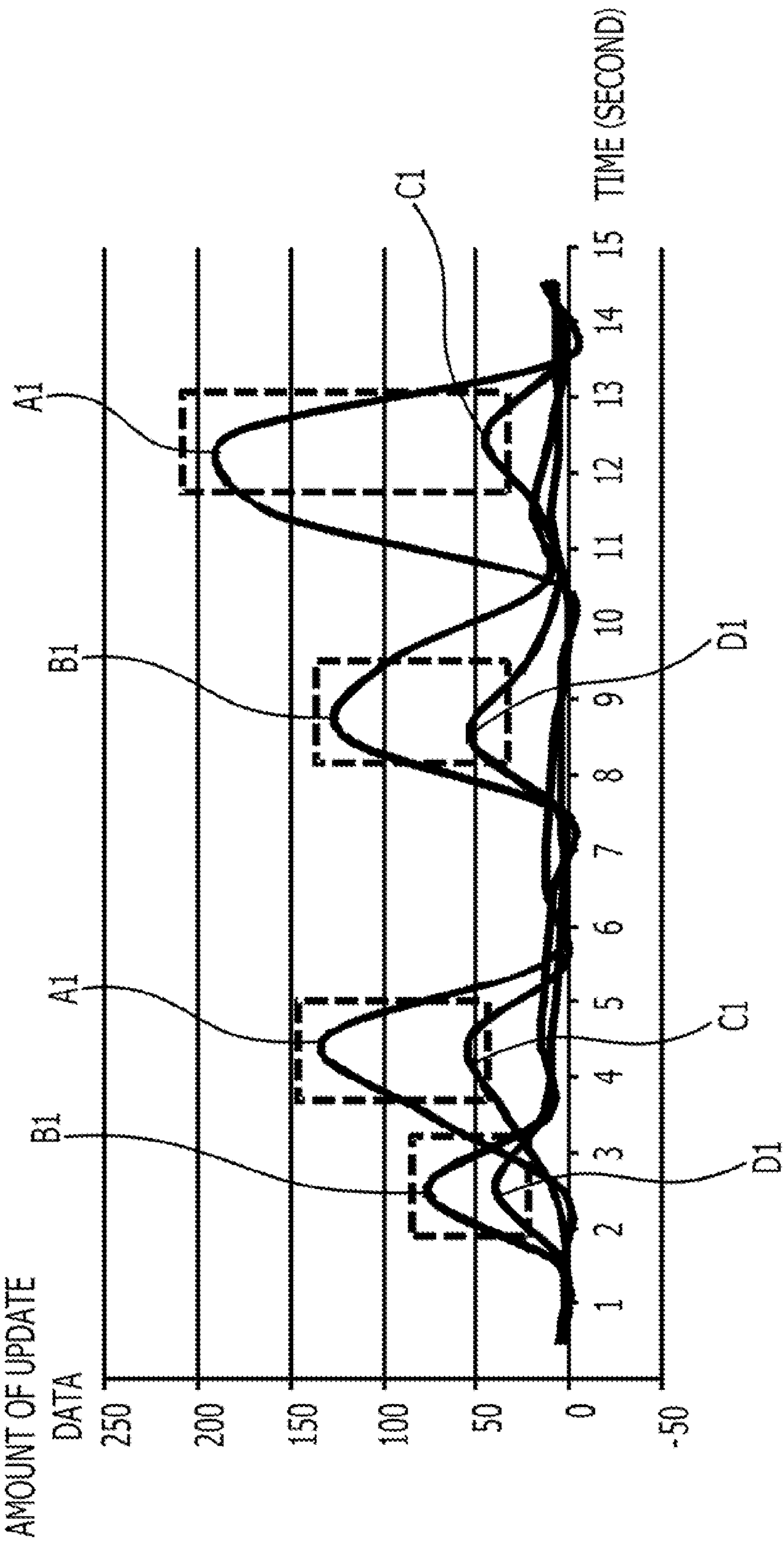
FIG. 9 illustrates associations between operation tool sections and data rendering sections.

FIG. 9 illustrates associations between the operation tool sections and the data rendering sections.

In the graph illustrated in FIG. 9, the vertical axis indicates the amount of update data and the horizontal axis indicates time (second). As illustrated in FIG. 9, an operation on an operation tool section C1 has a large influence on a data rendering section A1 and an operation on an operation tool section D1 has a large influence on a data rendering section B1. In the present embodiment, upon receiving the section-specific update frequency information from the update-frequency calculator 14*g* and receiving the current mouse-cursor position information from the operation-position detector 14*c*, the association-degree setter 14*h* creates a cursor-position management table that includes the received pieces of information. On the basis of the created cursor-position management table, the association-degree setter 14*h* calculates associations between the sections. In addition, the mouse-cursor section and a section having a highest degree of association with the mouse-cursor section are extracted and image data to be displayed in those sections are transmitted to the client apparatus 20 prior to image data to be displayed in other sections. As a result, a portion that has a low update frequency but is associated with a region having a high update frequency can be updated on the screen displayed on the display device 204*a*, prior to the other portions. Accordingly, it is possible to increase the speed of response to a user operation. In the following description, the operation tool sections and the data rendering sections are not distinguished from each other and are simply referred to as "sections A1, B1, C1, and D1".

The cursor-position management table created by the association-degree setter 14*h* will be described next.

FIG. 10 illustrates a cursor-position management table created by the association-degree setter.

A cursor-position management table T1 illustrated in FIG. 10 has a "time" column, an "update-frequency information" column, and a "mouse-cursor position (x, y)" column. Pieces of information that are horizontally arranged are associated with each other.

In the "time" column, the time at which the mouse-cursor position information is obtained from the operation-position detector 14*c* is contained.

In the "update-frequency information" column, the X coordinate, the Y coordinate, the width, the height, and the number of updates which are included in the section-specific update frequency information received from the update-frequency calculator 14*g* are contained.

In the "mouse-cursor position (x, y)" column, the mouse-cursor position information received from the operation-position detector 14*c* is contained. A description will be given with reference back to FIG. 3.

The priority setter 14*i* uses a section on which the user is currently performing an operation, an available band of the network 50, and the section association degrees in the frame buffer 13 to set priorities for data transfer of the respective sections. During the setting of the priorities, the priority setter 14*i* uses the user's current mouse-cursor position detected by the operation-position detector 14*c* and the section association degrees set by the association-degree setter 14*h*. In accordance with the mouse-cursor position, the priority setter 14*i* uses the association degrees, set by the association-degree setter 14*h*, to determine a section to be given a high priority and sends, to the update-difference converter 14*j*, an instruction for transmitting data for the determined section prior to data for the other sections.

The update-difference converter 14*j* converts the update image data into moving-image data or still-image data in accordance with the update frequency of the display region.

More specifically, each time the update-difference creator 14*e* generates an update rectangle, the update-difference converter 14*j* determines whether or not the generated update rectangle is included in the frequent-update region stored in the internal work memory, e.g., is included in a region to which the moving-image data is being transmitted by the communicator 14*a*. In this case, when information regarding the section to be given a high priority is received from the priority setter 14*i*, the update rectangle for the received section is processed prior to update rectangles for the other sections. When the generated update rectangle is not included in the frequent-update region, the update-region setter 14*f* causes the communicator 14*a* to transmit the image data of the update rectangle and the update frequency information.

Each time update image data is stored in the frame buffer 13, the update-difference converter 14*j* determines whether or not the update frequency information of a frequent-update region is registered in the internal memory in the update-region setter 14*f*. When the update frequency information of a frequent-update region is registered, the update-difference converter 14*j* cuts out, in the update image data stored in the frame buffer 13, a bitmap image for the portion corresponding to the frequent-update region. The update-difference converter 14*j* then encodes the cut-out bitmap image. In this case, for example, at a point when the amount of input bitmap image for the frequent-update region reaches the number of frames from which a stream can be generated, the update-difference converter 14*j* encodes the bitmap image for the frequent-update region. An encoding system may be, for example, an MPEG system, such as MPEG-2 or MPEG-4 system, or a Motion-JPEG system.

The screen-update reporter 14*k* performs processing for transmitting the update data converted by the update-difference converter 14*j*.

More specifically, the screen-update reporter 14*k* transmits the update-rectangle image data and the update frequency information, generated by the update-difference creator 14*e*, to the client apparatus 20. A communication protocol for transmitting the update-rectangle image data is, for example, an RFB protocol in VNC.

The screen-update reporter 14*k* transmits image data of the frequent-update region, the image data being encoded by the update-difference converter 14*j*, (the data is hereinafter referred to as "encoded frequent-update-region image data") to the client apparatus 20 in conjunction with the corresponding update frequency information. A communication protocol for transmitting the encoded frequent-update-region image data may be, for example, an RTP (Real-time Transport Protocol).

The channel-band detector 14*m* has a function for detecting a currently available band on a network channel used for data transmission/reception between the server apparatus 10 and the client apparatus 20. More specifically, the channel-band detector 14*m* obtains the amount of data transmitted from the screen-update reporter 14*k* and the amount of data actually transmitted from the communicator 14*a* to the client apparatus 20. The channel-band detector 14*m* then sends the amounts of the two pieces of data to the priority setter 14*i*. When the amount of data transmitted from the screen-update reporter 14*k* and the amount of data transmitted from the communicator 14*a* are equal to each other or when no data is transmitted from the screen-update reporter 14*k*, the channel-band detector 14*m* periodically transmits data for measuring an available band to the client apparatus 20. By doing so, the channel-band detector 14*m* estimates a currently available band and sends information of the currently available band to the priority setter 14*i*.

Functions of the client apparatus 20 will be described next.

<Functions of Client Apparatus>

The client apparatus 20 has a remote-screen controller 21. In the example of FIG. 3, in addition to the functional units illustrated in FIG. 3, the client apparatus 20 may further has various functions, such as a function of a sound output unit, of a known computer.

The remote-screen controller 21 receives the remote-screen control service, offered by the server apparatus 10, via the client-side remote-screen controlling application. As illustrated in FIG. 3, the remote-screen controller 21 includes a communicator 21*a*, an operation-information acquirer 21*b*, a screen-update information acquirer 21*c*, an image-data display unit 21*d*, and a moving-image data display unit 21*e*.

The communicator 21*a* transmits/receives information to/from the server apparatus 10 over the network 50.

The operation-information acquirer 21*b* acquires information of an operation input via the input device 205*a* and reports the acquired operation information to the server apparatus 10 via the communicator 21*a*. Examples of the operation information reported by the operation-information acquirer 21*b* include left and right clicks, double click, and drag of the mouse, as well as a mouse-cursor displacement obtained as a result of a movement operation of the mouse. Other examples of the operation information reported by the operation-information acquirer 21*b* include the amount of rotation of the mouse wheel and the type of pressed key on the keyboard.

The screen-update information acquirer 21*c* receives the update-rectangle image and the update frequency information of the frequent-update region via the communicator 21*a*, the update-rectangle image and the update frequency information being transmitted by the communicator 14*a* in the server apparatus 10. The screen-update information acquirer 21*c* also receives the frequent-update-region update frequency information transmitted by the update-region setter 14*f* in the server apparatus 10.

The screen-update information acquirer 21*c* receives the encoded frequent-update-region image data, transmitted by the communicator 14*a* in the server apparatus 10, and the update-rectangle update frequency information, transmitted along with the encoded frequent-update-region image data, via the communicator 21*a*.

The image-data display unit 21*d* causes the display device 204*a* to display the update-rectangle image received by the screen-update information acquirer 21*c*. For example, the image-data display unit 21*d* causes the bitmap image of the update rectangle to be displayed on a screen region that lies on the display device 204*a* and that corresponds to the frequent-update-region position and size included in the update-rectangle update frequency information received from the screen-update information acquirer 21*c*.

When the screen-update information acquirer 21*c* receives the frequent-update-region update frequency information, the image-data display unit 21*d* performs processing in the following manner. That is, the image-data display unit 21*d* sets, as a blank region in which no bitmap image is to be displayed, a screen region that lies on the display device 204*a* and that corresponds to the frequent-update-region position and size included in the frequent-update-region update frequency information.

The moving-image data display unit 21*e* decodes the encoded frequent-update-region image data received by the screen-update information acquirer 21*c*. The moving-image data display unit 21*e* may be equipped with a decoder employing a decoding system corresponding to the encoding system employed by the server apparatus 10.

On the basis of the frequent-update-region update frequency information received by the screen-update information acquirer 21*c*, the moving-image data display unit 21*e* causes the display device 204*a* to display the decoded image of the frequent-update region. For example, the moving-image data display unit 21*e* causes the decoded image of the frequent-update region to be displayed on a screen region that lies on the display device 204*a* and that corresponds to the frequent-update-region position and size included in the update frequency information of the frequent-update region.

The remote-screen controller 21 may be implemented by various types of integrated circuit or electronic circuit. At least one of the functional units included in the remote-screen controller 21 may also be implemented by another integrated circuit or electronic circuit. Examples of the integrated circuit include an ASIC (application specific integrated circuit) and an FPGA (field programmable gate array). Examples of the electronic circuit include a CPU and an MPU (micro processing unit).

Processing performed by the server apparatus 10 will now be described with reference to flowcharts.

Figure 11:
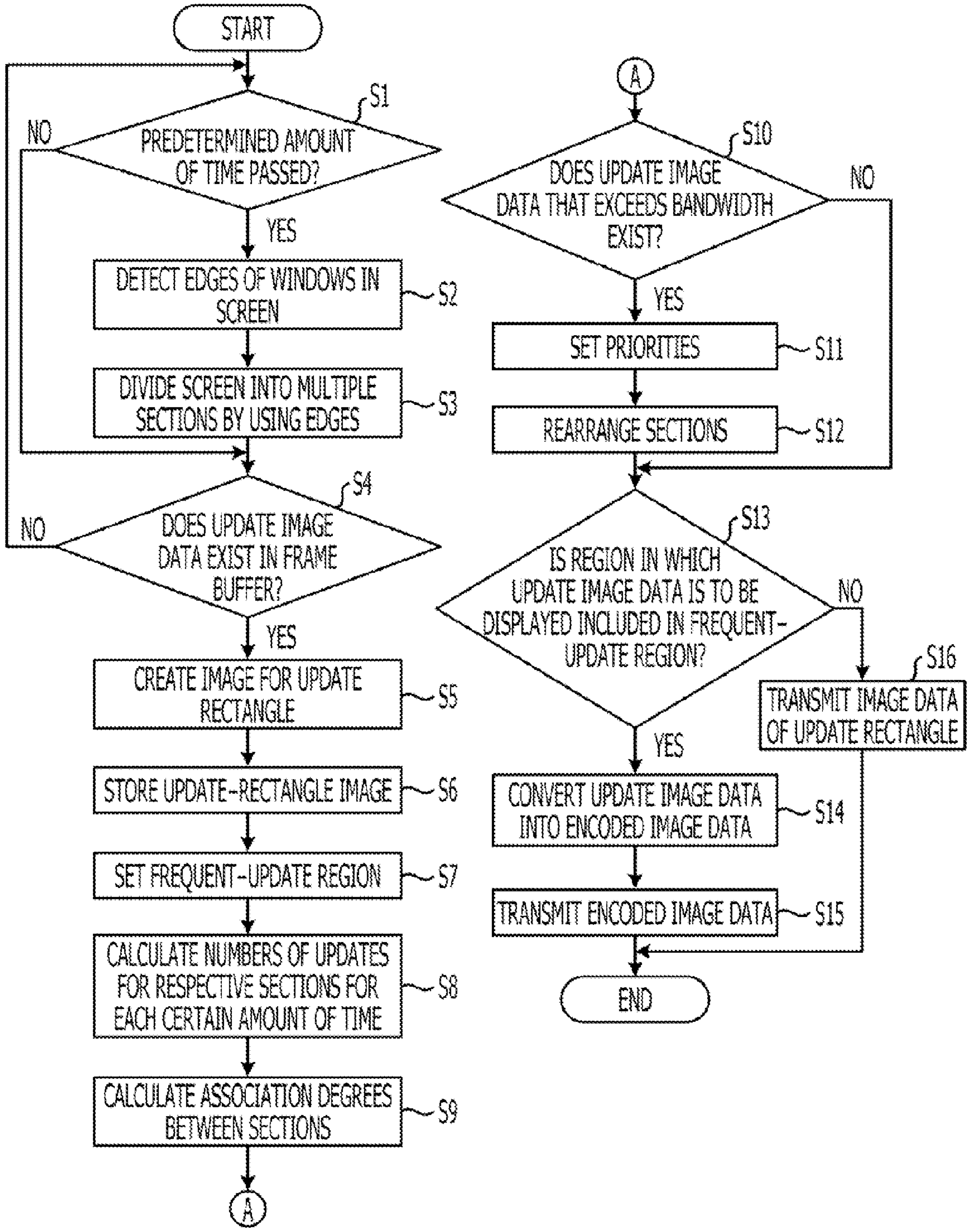
FIG. 11 is a flowchart of processing performed by the server apparatus.

FIG. 11 is a flowchart of processing performed by the server apparatus. After the processing of the units is briefly described first with reference to FIG. 11, functions thereof are described in detail with reference to more detailed flowcharts.

In operation S1, the server apparatus 10 determines whether or not a certain amount of time has passed. When the certain amount of time has not passed (No in operation S1), the process proceeds to operation S4. When the certain amount of time has passed (Yes in operation S1), the process proceeds to operation S2.

In operation S2, the window-edge detector 14*d* detects edges of windows in the screen. Thereafter, the process proceeds to operation S3.

In operation S3, the window-edge detector 14*d* divides the screen into multiple sections by using the detected edges. Thereafter, the process proceeds to operation S4.

In operation S4, the update-difference creator 14*e* determines whether or not update image data exists in the frame buffer 13. When update image data exists in the frame buffer 13 (Yes in operation S4), the process proceeds to operation S5. When no update image data exists in the frame buffer 13 (No in operation S4), the process returns to operation S1.

In operation S5, the update-difference creator 14*e* compares image data displayed on the client apparatus 20 during generation of a previous frame with the update image data written in the frame buffer 13 during generation of a current frame. The update-difference creator 14*e* then generates an update rectangle, which is obtained by coupling pixels in a portion that has changed from the previous frame and shaping the coupled pixels into a rectangle. Thereafter, the process proceeds to operation S6.

In operation S6, the update-difference creator 14*e* stores the created update rectangle. Thereafter, the process proceeds to operation S7.

In operation S7, the update-region setter 14*f* sets a frequent-update region. Thereafter, the process proceeds to operation S8.

In operation S8, the update-frequency calculator 14*g* calculates the numbers of updates the respective sections for each certain amount of time. Thereafter, the process proceeds to operation S9.

In operation S9, the association-degree setter 14*h* compares the numbers of updates in the same amount of time and calculates the association degrees between the sections. Thereafter, the process proceeds to operation S10.

In operation S10, the channel-band detector 14*m* determines whether or not update image data that exceeds the bandwidth of the channel between the communicator 14*a* and the communicator 21*a* exists. When update image data that exceeds the bandwidth exists (Yes in operation S10), the process proceeds to operation S11. When update image data that exceeds the bandwidth does not exist (No in operation S10), the process proceeds to operation S13.

In operation S11, the priority setter 14*i* sets priorities for the update image data for the corresponding sections, on the basis of the user's current mouse-cursor position detected by the operation-position detector 14*c* and the association degrees determined in operation S9. Thereafter, the process proceeds to operation S12.

In operation S12, the priority setter 14*i* rearranges the sections to be given a high priority according to the priorities set in operation S11 and sends information of the rearranged sections to the update-difference converter 14*j*. Thereafter, the process proceeds to operation S13.

In operation S13, the update-difference converter 14*j* obtains the update image data from the frame buffer 13. In this case, when the information of the section(s) to be given a priority is received from the priority setter 14*i*, the update image data for the received section(s) is processed prior to the update image data for the other sections. The update-difference converter 14*j* then determines whether or not a region in which the update image data is to be displayed is included in the frequent-update region. When it is determined that a region in which the update image data is to be displayed is included in the frequent-update region (Yes in operation S13) the process proceeds to operation S14. When it is determined that a region in which the update image data is to be displayed is not included in the frequent-update region (No in operation S13) the process proceeds to operation S16.

In operation S14, the update-difference converter 14*j* converts the update image data into encoded image data by cutting out, in the update image data stored in the frame buffer 13, a bitmap image corresponding to the frequent-update region and encoding the bitmap image. Thereafter, the process proceeds to operation S15.

In operation S15, the screen-update reporter 14*k* transmits the encoded image data, encoded by the update-difference converter 14*j*, to the client apparatus 20 via the communicator 14*a*. Thereafter, the processing illustrated in FIG. 11 ends. When the client apparatus 20 receives the encoded image data, the screen-update information acquirer 21*c* sends the received encoded image data to the moving-image data display unit 21*e*. The moving-image image data display unit 21*e* decodes the received encoded image data and displays the decoded image data on the display device 204*a*.

In operation S16, the screen-update reporter 14*k* transmits the image data of the update rectangle to the client apparatus 20 via the communicator 14*a*. Thereafter, the processing illustrated in FIG. 11 ends. When the client apparatus 20 receives the image data of the update rectangle, the screen-update information acquirer 21*c* sends the received image data to the image-data display unit 21*d*. The image-data display unit 21*d* displays the received image data on the display device 204*a*.

The description of the processing in FIG. 11 is finished at this point.

Processing (i.e., operation-section detection processing) of the operation-position detector 14*c* will be described next.

Figure 12:
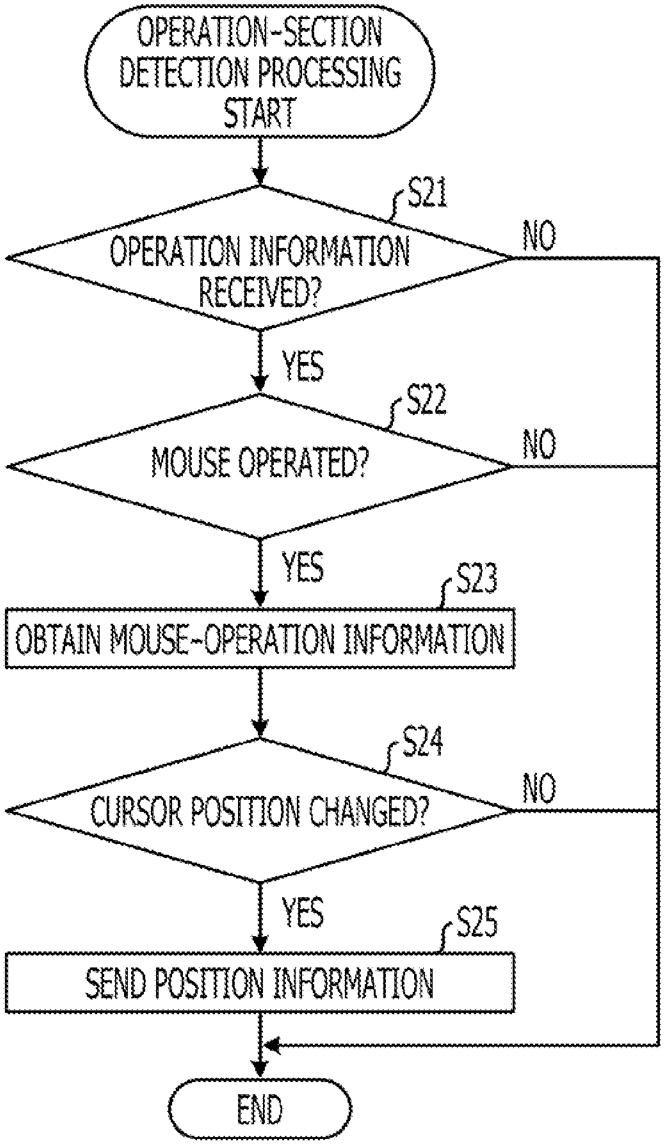
FIG. 12 is a flowchart illustrating operation-section detection processing.

FIG. 12 is a flowchart illustrating operation-section detection processing.

In operation S21, the operation-position detector 14*c* determines whether or not reception of operation information is detected at the communicator 14*a*. When reception of operation information is detected (Yes in operation S21), the process proceeds to operation S22. When reception of operation information is not detected (No in operation S21), the operation-section detection processing ends.

In operation S22, the operation-position detector 14*c* determines whether or not the mouse is operated. More specifically, the operation-position detector 14*c* extracts mouse-cursor position information from the received operation information and compares the extracted position information with previously extracted position information. When the pieces of position information do not match each other, it is determined that the mouse is operated. When it is determined that the mouse is operated (Yes in operation S22), the process proceeds to operation S23. When it is determined that the mouse is not operated (No in operation S22), the operation-section detection processing ends.

In operation S23, the operation-position detector 14*c* obtains mouse-operation information and extracts the mouse-cursor position therefrom. Thereafter, the process proceeds to operation S24.

In operation S24, the operation-position detector 14*c* compares the extracted mouse-cursor position with a previous mouse-cursor position to determine whether or not the position of the mouse cursor has been changed. When it is determined that the position of the mouse cursor has been changed (Yes in operation S24), the process proceeds to operation S25. When it is determined that the position of the mouse cursor has not been changed (No in operation S24), the operation-section detection processing ends.

In operation S25, the operation-position detector 14*c* sends the mouse-cursor position information to the association-degree setter 14*h* and the priority setter 14*i*. Thereafter, the operation-section detection processing ends.

The description of the operation-section detection processing is finished at this point.

Processing (i.e., channel-band detection processing) of the channel-band detector 14*m* will be described next.

Figure 13:
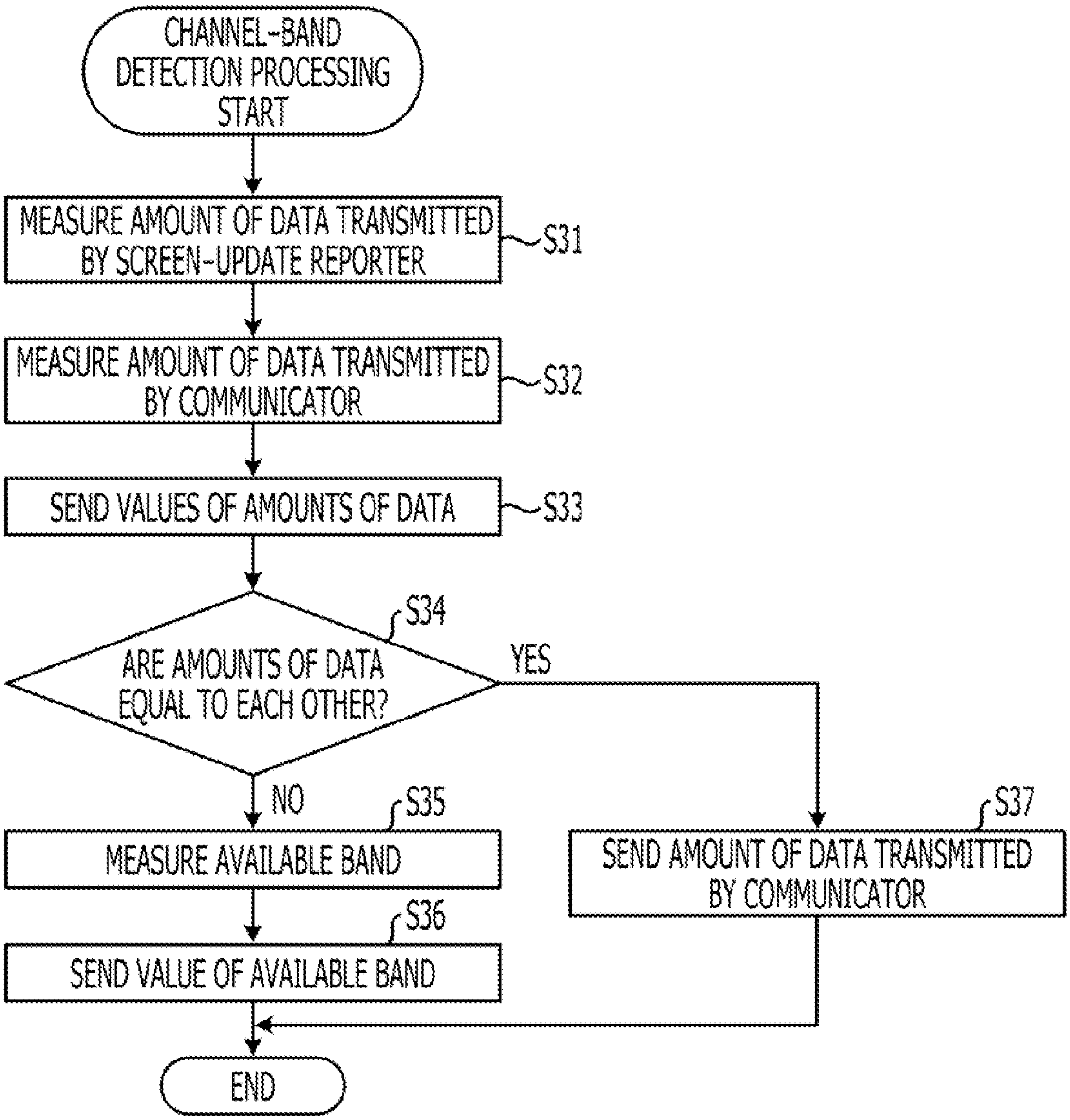
FIG. 13 is a flowchart illustrating channel-band detection processing.

FIG. 13 is a flowchart illustrating channel-band detection processing.

In operation S31, the channel-band detector 14*m* measures the amount of data transmitted by the screen-update reporter 14*k*. Thereafter, the process proceeds to operation S32.

In operation S32, the channel-band detector 14*m* measures the amount of data currently transmitted by the communicator 14*a*. Thereafter, the process proceeds to operation S33.

In operation S33, the channel-band detector 14*m* sends the values of the two amounts of data, measured in operations S31 and S32, to the priority setter 14*i*. Thereafter, the process proceeds to operation S34.

In operation S34, the channel-band detector 14*m* determines whether or not the two amounts of data measured in operations S31 and S32 are equal to each other. When the amounts of data are equal to each other (Yes in operation S34), the process proceeds to operation S37. When the amounts of data are not equal to each other (No in operation S34), the process proceeds to operation S35. Also, when no data is transmitted from the screen-update reporter 14*k*, the process proceeds to operation S37.

In operation S35, the channel-band detector 14*m* transmits data for measurement to the client apparatus 20 to measure an available band. Thereafter, the process proceeds to operation S36.

In operation S36, the channel-band detector 14*m* sends the value of the available band, measured in operation S35, to the priority setter 14*i*. Thereafter, the channel-band detection processing ends.

In operation S37, on the other hand, the channel-band detector 14*m* sends the amount of data, currently transmitted by the communicator 14*a*, to the priority setter 14*i* as the value of the available band. Thereafter, the channel-band detection processing ends.

The description of the channel-band detection processing is finished at this point.

Processing (i.e., window-edge detection processing) of the window-edge detector 14*d* will be described next.

Figure 14:
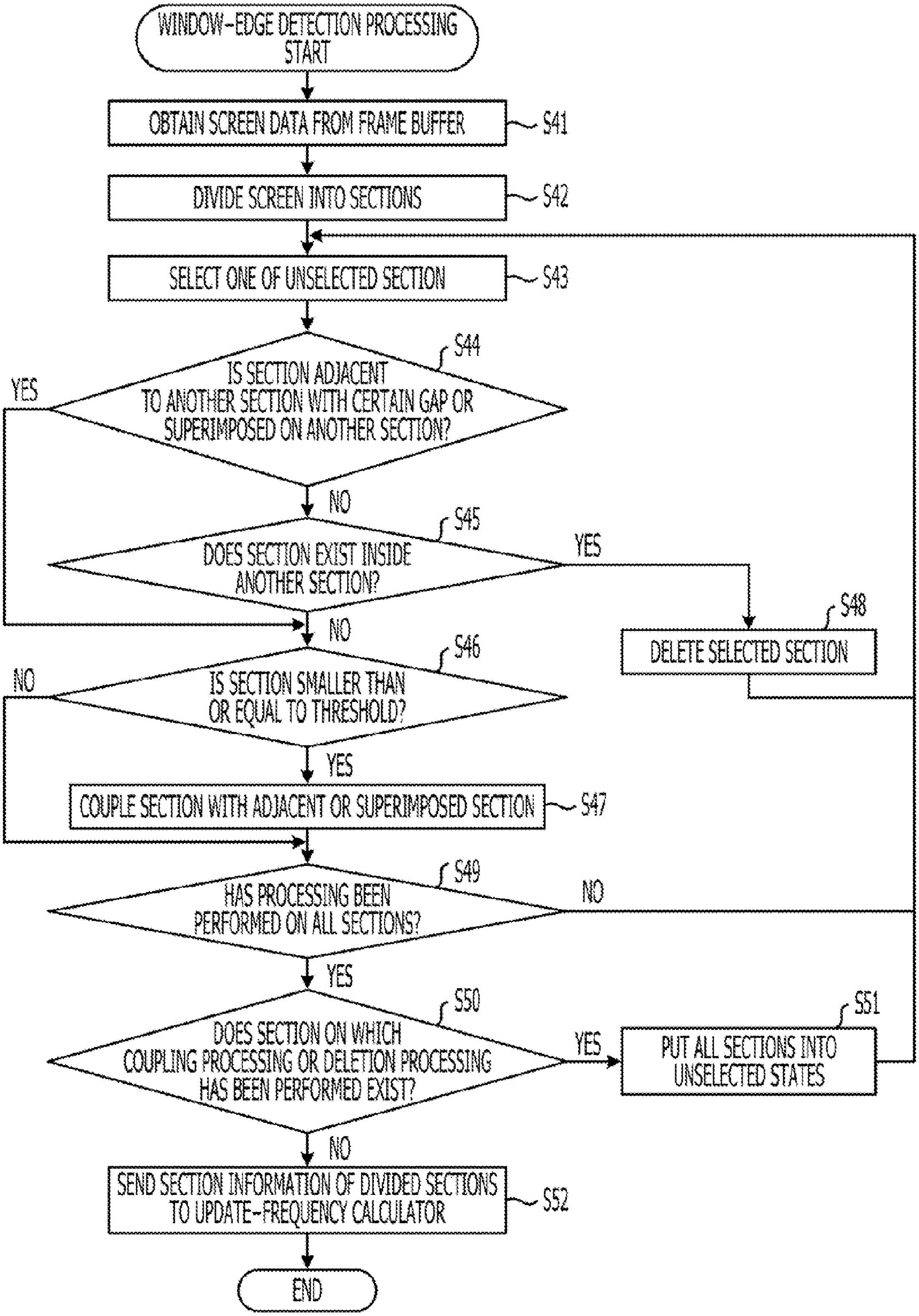
FIG. 14 is a flowchart illustrating window-edge detection processing.

FIG. 14 is a flowchart illustrating window-edge detection processing.

In operation S41, the window-edge detector 14*d* obtains screen data stored in the frame buffer 13. Thereafter, the process proceeds to operation S42.

In operation S42, the window-edge detector 14*d* performs edge detection processing on the screen data, obtained in operation S41, to detect edges and divides the screen into multiple sections by using edges.

In operation S43, the window-edge detector 14*d* selects one of unselected sections of the sections divided in operation S42. Thereafter, the process proceeds to operation S44.

In operation S44, the window-edge detector 14*d* determines whether or not the section selected in operation S43 is adjacent to another section with a certain gap therebetween or is superimposed on another section. When the section is adjacent to another section with a certain gap therebetween or is superimposed on another section (Yes in operation S44), the process proceeds to operation S46. When the section is neither adjacent to another section with a certain gap therebetween nor superimposed on another section (No in operation S44), the process proceeds to operation S45.

In operation S45, the window-edge detector 14*d* determines whether or not the section selected in operation S43 exists inside another section. When the selected section exists inside another section (Yes in operation S45), the process proceeds to operation S48. When the selected section does not exist inside another section (No in operation S45), the process proceeds to operation S46.

In operation S46, the window-edge detector 14*d* determines whether or not the area of the section selected in operation S43 is smaller than or equal to a predetermined area threshold (e.g., 200 pixels×200 pixels). When the area of the section selected in operation S43 is smaller than or equal to the predetermined area threshold (Yes in operation S46), the process proceeds to operation S47. When the area of the section selected in operation S43 is larger than the predetermined area threshold (No in operation S46), the process proceeds to operation S49.

In operation S47, the window-edge detector 14*d* couples the section selected in operation S43 with the adjacent or superimposed section. Thereafter, the process proceeds to operation S49.

In operation S48, on the other hand, the window-edge detector 14*d* deletes the section selected in operation S43. Thereafter, the process returns to operation S43.

In operation S49, the window-edge detector 14*d* determines whether or not the processing in operations S44 to S48 has been performed on all sections. When it is determined that the processing in operations S44 to S48 has been performed on all sections (Yes in operation S49) the process proceeds to operation S50. When it is determined that the processing in operations S44 to S48 has not been performed on all sections (No in operation S49) the process returns to operation S43.

In operation S50, the window-edge detector 14*d* determines whether or not any sections on which the coupling processing in operation S47 or the deletion processing in operation S48 has been performed exist in all of the selected sections. When the section on which the coupling processing or deletion processing has been performed exists (Yes in operation S50), the process proceeds to operation S51. Operation S50 is performed since any section on which the coupling processing or the deletion processing is to be further performed may exist. When the section on which the coupling processing or deletion processing has been performed does not exist (No in operation S50), the process proceeds to operation S52.

In operation S51, the window-edge detector 14*d* puts all of the sections into unselected states. Thereafter, the process returns to operation S43.

In operation S52, the window-edge detector 14*d* sends, to the update-frequency calculator 14*g*, section information including the sections that remain as a result of the coupling processing and deletion processing. Thereafter, the window-edge detection processing ends.

The description of the window-edge detection processing is finished at this point.

Processing (i.e., update-frequency calculation processing) of the update-frequency calculator 14*g* will be described next.

Figure 15:
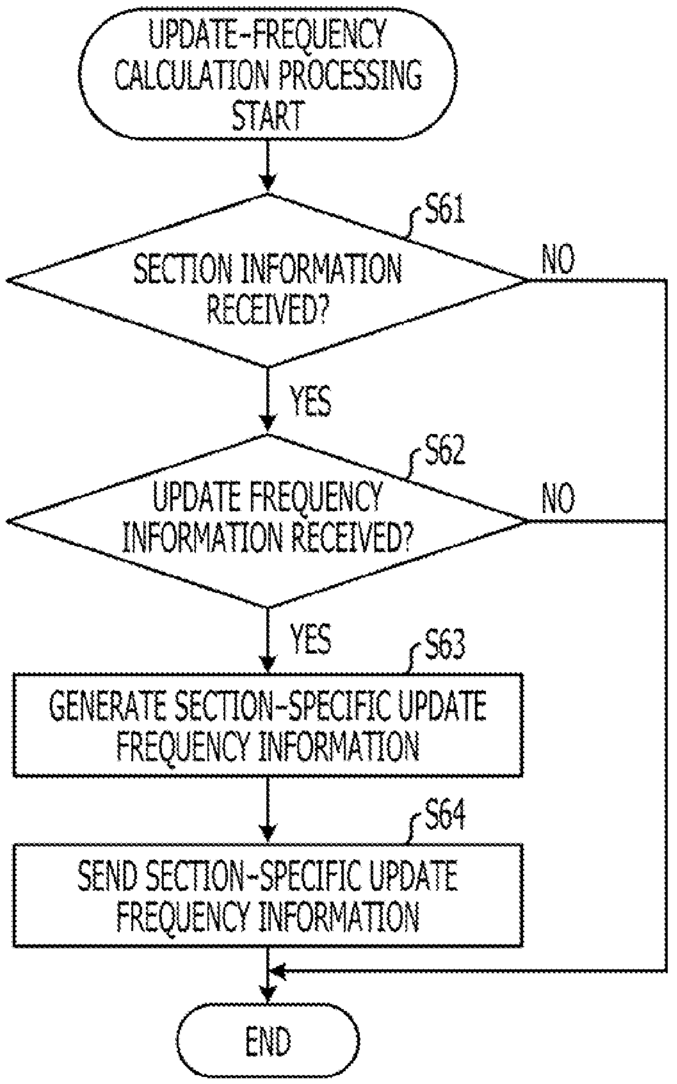
FIG. 15 is a flowchart illustrating update-frequency calculation processing.

FIG. 15 is a flowchart illustrating update-frequency calculation processing.

In operation S61, the update-frequency calculator 14*g* determines whether or not the section information is received from the window-edge detector 14*d*. When the section information is received (Yes in operation S61), the process proceeds to operation S62. When no section information is received (No in operation S61), the update-frequency calculation processing ends.

In operation S62, the update-frequency calculator 14*g* determines whether or not the update frequency information is received from the update-region setter 14*f*. When the update frequency information is received (Yes in operation S62), the process proceeds to operation S63. When no update frequency information is received (No in operation S62), the update-frequency calculation processing ends.

In operation S63, the update-frequency calculator 14*g* generates section-specific update frequency information indicating the update frequency for each section, on the basis of the section information received in operation S61 and the update frequency information received in operation S62. Thereafter, the process proceeds to operation S64.

In operation S64, the update-frequency calculator 14*g* sends the section-specific update frequency information, generated in operation S63, to the association-degree setter 14*h* and the priority setter 14*i*. Thereafter, the update-frequency calculation processing ends.

The description of the update-frequency calculation processing is finished at this point.

Processing (i.e., association-degree setting processing) of the association-degree setter 14*h* will be described next.

Figure 16:
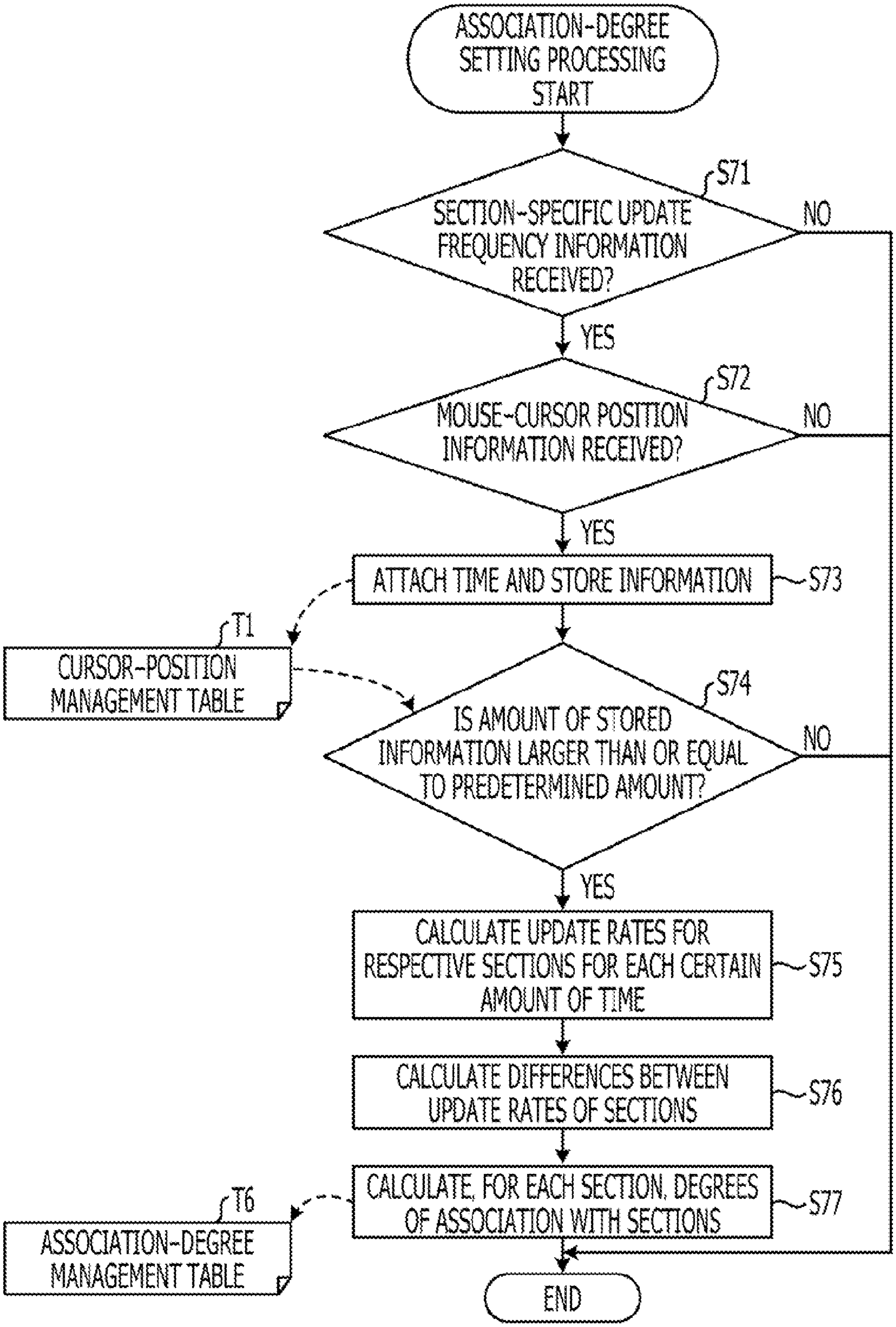
FIG. 16 is a flowchart illustrating association-degree setting processing.

FIG. 16 is a flowchart illustrating association-degree setting processing.

In operation S71, the association-degree setter 14*h* determines whether or not the section-specific update frequency information is received from the update-frequency calculator 14*g*. When the section-specific update frequency information is received (Yes in operation S71), the process proceeds to operation S72. When no section-specific update frequency information is received (No in operation S71), the association-degree setting processing ends.

In operation S72, the association-degree setter 14*h* determines whether or not the mouse-cursor position information is received from the operation-position detector 14*c*. When the mouse-cursor position information is received (Yes in operation S72), the process proceeds to operation S73. When no mouse-cursor position information is received (No in operation S72), the association-degree setting processing ends.

In operation S73, the association-degree setter 14*h* attaches (associates) the time at which the mouse-cursor position information was received in operation S72 to (with) the received mouse-cursor position information and stores the associated information in the cursor-position management table T1.

In operation S74, the association-degree setter 14*h* determines whether or not the amount of information stored in the cursor-position management table T1 is larger than or equal to a predetermined amount. When the amount of information stored in the cursor-position management table T1 is larger than or equal to the predetermined amount (Yes in operation S74), the process proceeds to operation S75. When the amount of information stored in the cursor-position management table T1 is smaller than the predetermined amount (No in operation S74), the association-degree setting processing ends.

In operation S75, the association-degree setter 14*h* calculates update rates for the respective sections for each certain amount of time. Thereafter, the process proceeds to operation S76.

In operation S76, the association-degree setter 14*h* calculates differences between the update rates of the sections. Thereafter, the process proceeds to operation S77.

In operation S77, the association-degree setter 14*h* calculates, for each section, the degrees of association with the sections. The association-degree setter 14*h* then stores the determined association degrees in an association-degree management table T6 (described below). Thereafter, the association-degree setting processing ends.

The description of the association-degree setting processing is finished at this point.

Processing (i.e., priority setting processing) of the priority setter 14*i* will be described next.

Figure 17:
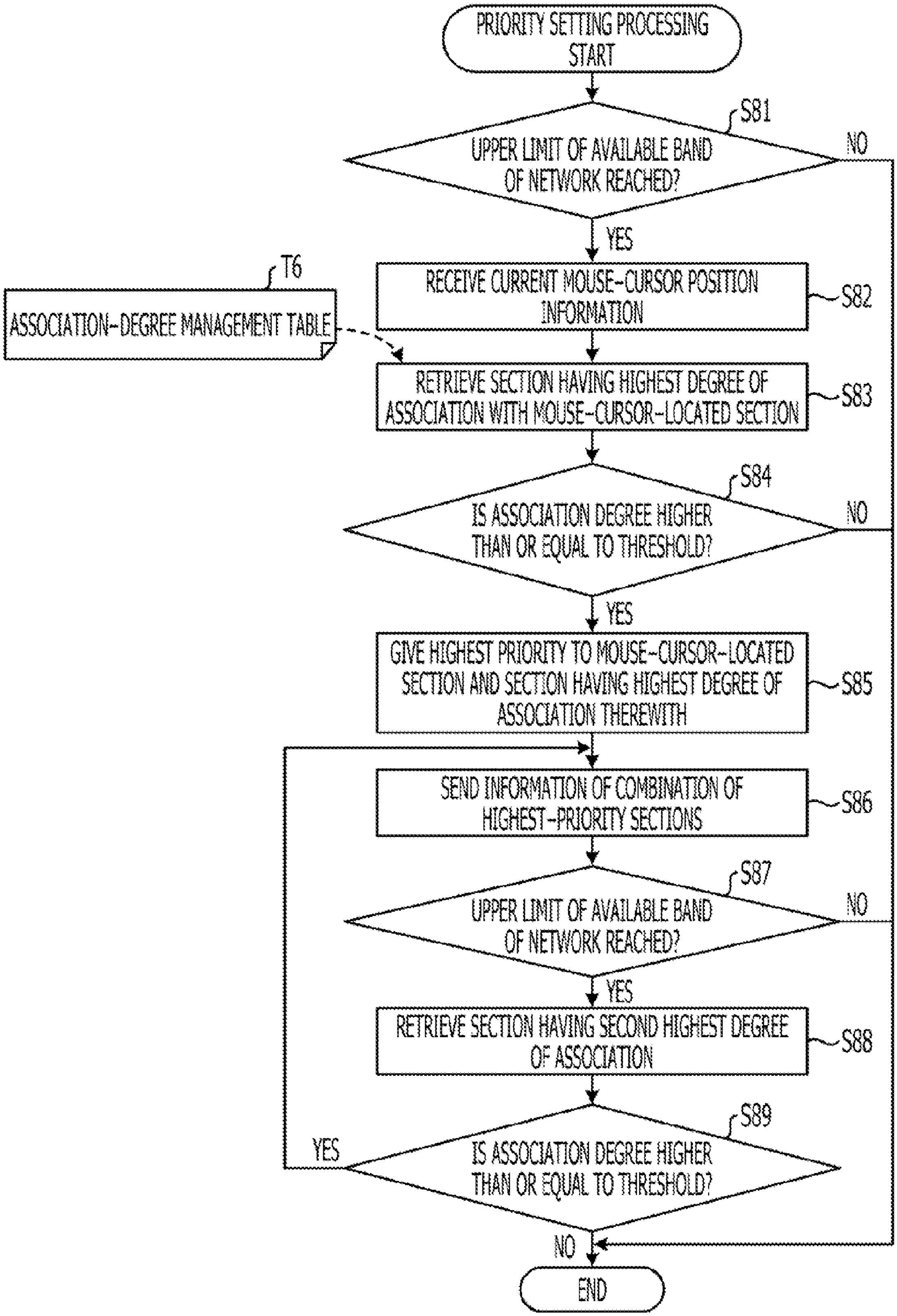
FIG. 17 is a flowchart illustrating priority setting processing.

FIG. 17 is a flowchart illustrating priority setting processing.

In operation S81, on the basis of the currently available network band detected by the channel-band detector 14*m*, the priority setter 14*i* determines whether or not data transmitted by the communicator 14*a* reaches an upper limit of the available band of the network 50. When the data transmitted by the communicator 14*a* reaches the upper limit of the available band of the network 50 (Yes in operation S81), the process proceeds to operation S82. When the data transmitted by the communicator 14*a* does not reach the upper limit of the available band of the network 50 (No in operation S81), the priority setting processing ends.

In operation S82, the priority setter 14*i* receives the mouse-cursor position information from the operation-position detector 14*c*, and identifies the section in which the mouse cursor is located, on the basis of the section information created by the window-edge detector 14*d*. Thereafter, the process proceeds to operation S83.

In operation S83, the priority setter 14*i* refers to the association-degree management table to retrieve the section having a highest degree of association with the mouse-cursor-located section identified in operation S82. Thereafter, the process proceeds to operation S84.

In operation S84, the priority setter 14*i* determines whether or not the association degree of the section retrieved in operation S83 is higher than or equal to a predetermined threshold. When the association degree of the section retrieved in operation S83 is higher than or equal to the predetermined threshold (Yes in operation S84), the process proceeds to operation S85. When the association degree of the section retrieved in operation S83 is lower than the predetermined threshold (No in operation S84), the priority setting processing ends.

In operation S85, the priority setter 14*i* sets a combination of the mouse-cursor-located section and the section that is the most highly associated therewith as highest-priority sections. Thereafter, the process proceeds to operation S86.

In operation S86, the priority setter 14*i* sends information of the combination of the highest-priority sections to the update-difference converter 14*j*. Thereafter, the process proceeds to operation S87.

In operation S87, a determination is made as to whether or not data transmitted by the communicator 14*a* reaches the upper limit of the available band of the network 50, on the basis of the currently available network band detected by the channel-band detector 14*m*. When the data transmitted by the communicator 14*a* reaches the upper limit of the available band of the network 50 (Yes in operation S87), the process proceeds to operation S88. When the data transmitted by the communicator 14*a* does not reach the upper limit of the available band of the network 50 (No in operation S87), the priority setting processing ends.

In operation S88, the priority setter 14*i* refers to the association-degree management table T6 to retrieve the section having a second highest degree of association with the mouse-cursor-located section after the section identified in operation S83. Thereafter, the process proceeds to operation S89.

In operation S89, the priority setter 14*i* determines whether or not the association degree of the section retrieved in operation S88 is higher than or equal to a predetermined threshold. When the association degree of the section retrieved in operation S88 is higher than or equal to the predetermined threshold (Yes in operation S89), the process returns to operation S86. When the association degree of the section retrieved in operation S88 is lower than the predetermined threshold (No in operation S89), the priority setting processing ends.

The description of the priority setting processing is finished at this point.

Any section can assume a value of the association degree. Thus, if priority is simply given to the section having the highest association degree, data for the section(s) that does not have an absolutely high association degree is also transmitted prior to data for the other sections. Accordingly, in the priority setting processing, the threshold is set and information regarding a combination of the mouse-cursor-located section and sections whose degrees of association therewith are higher than or equal to the threshold is transmitted prior to information for the other sections. At the point when the priority processing is executed, the amount of data generated is larger than the amount of already transmitted data. Thus, transmitting the data of only the sections having the highest association degree makes it possible to reduce the amount of data generated and also makes it possible to transmit all of generated data. In addition, the use of the association degree also allows the data for the section having a gentle update frequency to be transmitted and displayed with high priority, thus making it possible to improve the operation response felt by the user.

In the present embodiment, in operation S84 described above, the priority setter 14*i* determines whether or not the retrieved association degree is higher than or equal to the threshold. Alternatively, however, the arrangement may be such that, after the association-degree setter 14*h* calculates the association degrees, the association degree(s) that is lower than the threshold is deleted and operation S84 is eliminated in the priority setting processing.

Specific examples of the processing operations will be described next.

Figure 18:
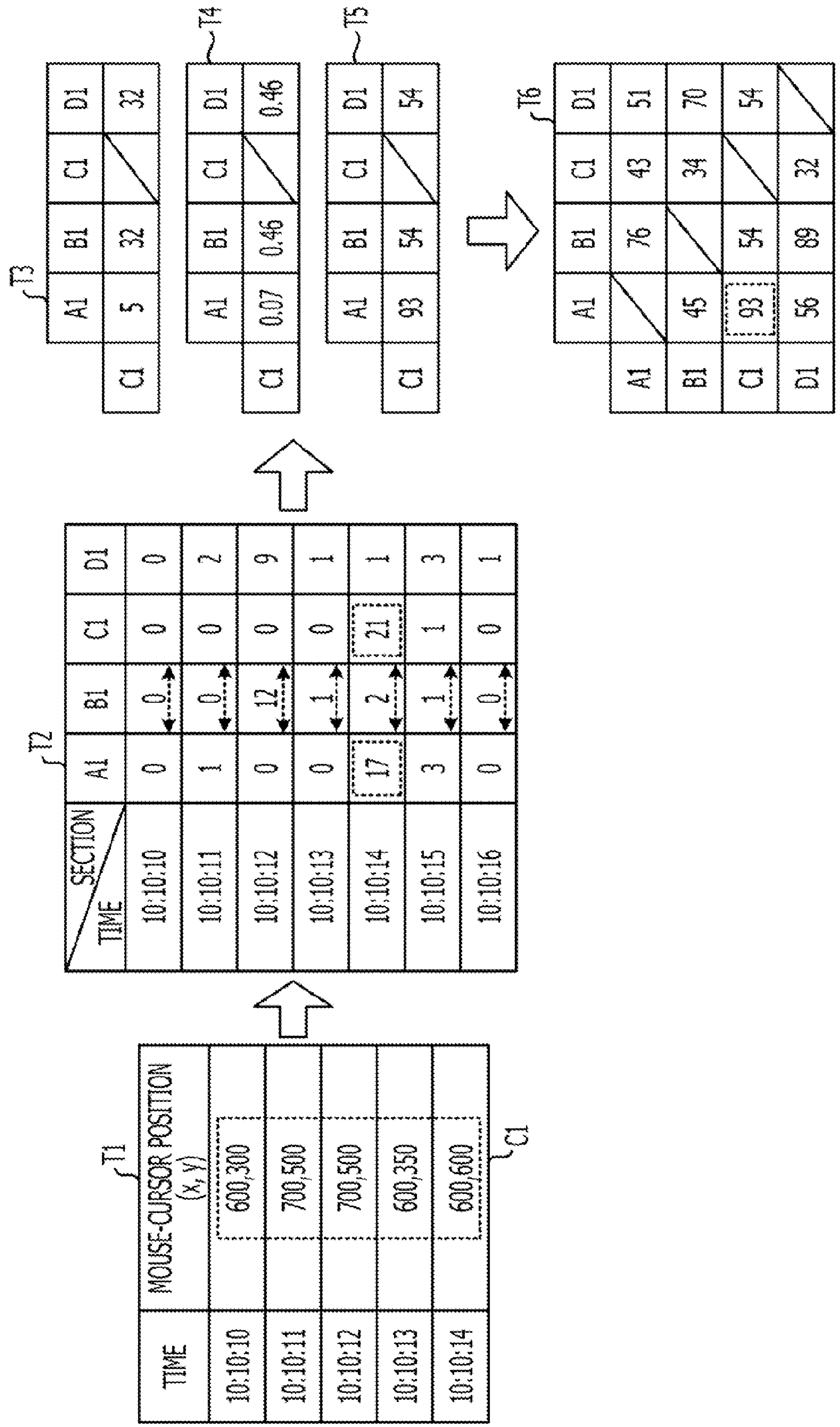
FIG. 18 illustrates a specific example of association-degree setting processing.

FIG. 18 illustrates a specific example of association-degree setting processing.

In a cursor-position management table T1 illustrated in FIG. 18, the "update-frequency information" column is omitted. In the cursor-position management table T1 illustrated in FIG. 18, the position of the mouse cursor is assumed to be located in the section C1 between time 10:10:10 and time 10:10:14.

When the amount of information accumulated in the cursor-position management table T1 is larger than or equal to a certain amount, the association-degree setter 14*h* adds up the numbers of updates in each section and calculates an update rate indicating what percentage of the updates in the total amount of time for each update occurrence time.

FIG. 18 illustrates a table T2 that includes the calculated update rates.

The table T2 indicates that, for example, update rates of 0, 1, 0, 0, and 17 (in units of %) are obtained in the section A1 between time 10:10:10 and time 10:10:14.

After calculating the update rates, the association-degree setter 14*h* uses the table T2 to calculate differences between the update rates for each update occurrence time at which operations were performed on the sections. FIG. 18 illustrates a table T3 that includes the calculated update-rate differences.

For example, when update rates of 0, 1, 0, 0, and 17 are obtained in the section A1 between time 10:10:10 and time 10:10:14, update rates of 0, 0, 0, 0, and 21 are obtained in the section C1 between time 10:10:10 and time 10:10:14, and the mouse cursor is located in the section C1 during the update time, the difference of the two update rates is calculated to be 5 $(=|0-0|+|0-1|+|0-0|+|0-0|+|21-17|)$. This value "5" is used as an update-rate difference of the section A1 relative to the operation on the section C1. Similarly, an update-rate difference of the section B1 relative to the section C1 is determined to be 32 and an update-rate difference of the section D1 relative to the section C1 is determined to be 32.

The association-degree setter 14*h* adds up the update-rate differences of all of the sections and divides the update-rate differences between the sections to calculate an update-rate mismatch degree relative to the section C1.

FIG. 18 illustrates a table T4 that includes the calculated update-rate mismatch degrees.

For example, the mismatch degree of the section A1 relative to the operation on the section C1 may be determined in the following manner. Summation of the update-rate differences in the table T3 yields 69 (=5+32+32). Division of the update-rate difference "5" of the section A1 relative to the operation on section C1 by 69 (i.e., 5/69) yields 0.072 . . . . Other mismatch degrees can also be determined in the same manner.

The association-degree setter 14*h* multiplies values, obtained by subtracting the values included in the table T4 from "1", by 100 to thereby calculate the association degrees. FIG. 18 illustrates a table T5 indicating the calculated association degrees. For example, in the table T4, the association degree of the section A1 relative to the operation on the section C1 may be determined in the following manner. Since the mismatch degree of the section A1 relative to the operation on the section C1 is 0.07 in the table T4, the association degree is 93% $(=(1-0.07)\times100))$. Other association degrees can also be determined in the same manner.

FIG. 18 illustrates an association-degree management table T6 that includes all the association degrees between the sections. Checking the degree of association of the mouse-cursor-located section with another section, as described above, makes it possible to determine the association degrees between the sections.

A specific example of the priority setter will be described next with reference to an association-degree management table T6.

A description in this specific example will be given of an example of a case in which the position information received by the priority setter 14*i* indicates that the mouse cursor is located in the section C1.

The priority setter 14*i* refers to the row of C1 in the association-degree management table T6 to retrieve the section that is the most highly associated with the section C1. Since the section A1 having an association degree of 93 has the highest degree of association with the section C1 in the association-degree management table T6, the highest association degree is given to the section C1 and the section A1. The priority setter 14*i* then determines that data for the sections C1 and A1 are to be transmitted with high priority. The priority setter 14*i* then sends information of the combination of the sections C1 and A1 to the update-difference converter 14*j*. If the amount of data to be transmitted exceeds the amount of data generated as a result of the processing described above, image data of an update rectangle belonging to the section B1 having a second highest degree of association with the section C1 after the section A1 is transmitted to the update-difference converter 14*j*.

As described above, according to the information processing system 5 of the present embodiment, the server apparatus 10 detects edges from the desktop screen, divides the desktop screen into multiple sections, calculates update frequencies of the respective sections, determines degrees of association with the mouse-cursor-located section, and transmits the image data of update rectangles for the sections having the highest association degree to the client apparatus 20 prior to the image data for the other sections. Accordingly, it is possible to increase the speed of response to a user operation.

The processing performed by the server apparatus 10 may also be executed by a plurality of apparatuses in a distributed manner. For example, the arrangement may be such that one apparatus performs processing up to the association-degree setting processing to generate the association-degree management table T6 and another apparatus determines a combination of the sections having the highest association degree by using the association-degree management table T6.

Third Embodiment

An information processing system according to a third embodiment will be described next.

The information processing system according to the third embodiment will be described below in conjunction with, mainly, points that are different from those of the second embodiment described above, and a description of similar points is not given hereinafter.

The information processing system according to the third embodiment is different from the information processing system according to the second embodiment in that the window-edge detector 14*d* refers to the association-degree management table T6, set by the association-degree setter 14*h*, to change conditions for setting the sections. Two methods will be described below.

In a first method, when the association degree of one section in the association-degree management table T6 set by the association-degree setter 14*h* has no difference from the association degrees of any other sections and is equal to the association degrees thereof (or has a difference that is smaller than or equal to a predetermined threshold), the window-edge detector 14*d* performs processing for excluding the section in the window-edge detection processing.

For example, when sections A1, B1, C1, D1, E1, and F1 exist in the association-degree management table T6 and the association degree of the section F1 has no difference from the association degrees of any other sections A1 to E1 and is equal to the association degrees thereof (or has a difference that is smaller than or equal to a predetermined threshold), the window-edge detector 14*d* performs processing for excluding the section F1 in the window-edge detection processing.

Figure 19:
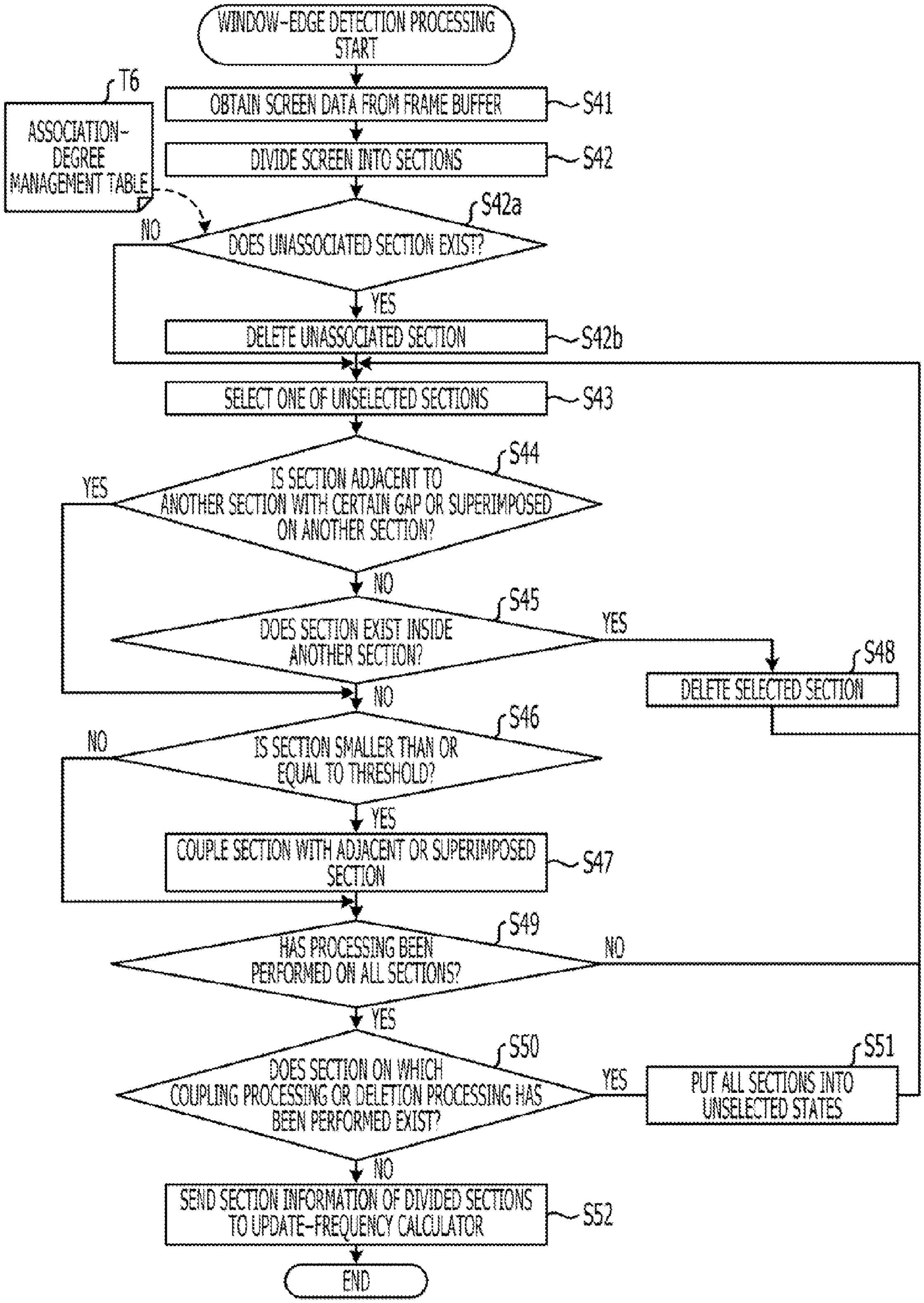
FIG. 19 is a flowchart illustrating first window-edge detection processing in a third embodiment.

FIG. 19 is a flowchart illustrating first window-edge detection processing in the third embodiment. Operations that are different from those in the second embodiment will be particularly described below.

In operation S42*a*, the window-edge detector 14*d* refers to the association-degree management table T6 to determine whether or not a section (e.g., an unassociated section) whose degrees of association with all other sections are lower than or equal to a predetermined value exists in the sections stored in the association-degree management table T6. When an unassociated section exists (Yes in operation S42*a*), the process proceeds to operation S42*b*. When no unassociated section exists (No in operation S42*a*), the process proceeds to operation S43.

In operation S42*b*, the window-edge detector 14*d* deletes the unassociated section from the sections divided in operation S42. Thereafter, the process proceeds to operation S43.

In a second method, when the association degrees in the association-degree management table T6 set by the association-degree setter 14*h* have not difference from the association degrees of any other sections and are equal to the association degrees (or have differences that are smaller than or equal to a predetermined threshold), the window-edge detector 14*d* changes the conditions for the edge detection and for the subsequent section division and performs processing so as to perform more finer section division.

For example, when section A1, B1, C1, and D1 exist and these sections have no differences in the association degrees therebetween (or have differences that are smaller than or equal to the predetermined threshold), the threshold in operation S45 may be varied in the edge detection processing so as to increase the number of sections in the screen.

Figure 20:
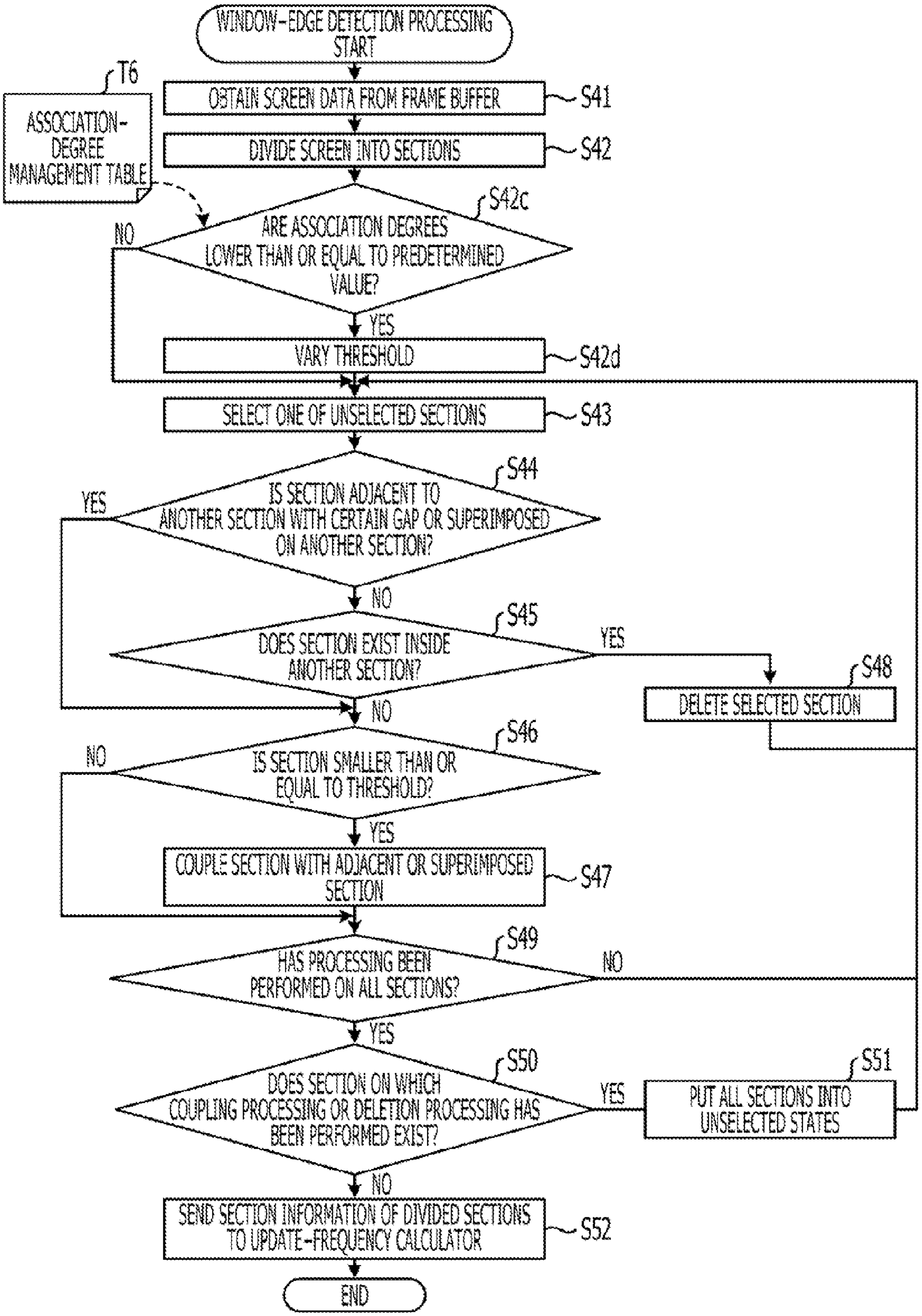
FIG. 20 is a flowchart illustrating second window-edge detection processing in the third embodiment.

FIG. 20 is a flowchart illustrating second window-edge detection processing in the third embodiment. Operations that are different from those in the second embodiment will be particularly described below.

In operation S42*c*, the window-edge detector 14*d* refers to the association-degree management table T6 to determine whether or not all of the association degrees included in the association-degree management table T6 are lower than or equal to a predetermined value. When all of the association degrees are lower than or equal to the predetermined value (Yes in operation S42*c*), the process proceeds to operation S42*d*. When not all of the association degrees are lower than or equal to the predetermined value (No in operation S42*c*), the process proceeds to operation S43.

In operation S42*d*, the window-edge detector 14*d* reduces the value of the threshold to be used in operation S46. Thereafter, the process proceeds to operation S43.

Once the value of the threshold to be used in operation S46 is reduced, when an association degree that is larger than the predetermined value exists in the association degrees included in the association-degree management table T6, processing for returning the reduced value of the threshold to its original value may also be performed (although such an arrangement is not illustrated in the flowchart in FIG. 19).

The information processing system according to the third embodiment provides substantially the same advantages as the information processing system according to the second embodiment.

According to the first window detection processing described above, the amount of calculation is further reduced to thereby make it possible to speed up the response to a user operation. According to the second window detection processing described above, the threshold is reduced, so that the number of sections increases. This arrangement makes it possible to increase the possibility that the sections having a high association degree are identifiable.

Fourth Embodiment

An information processing system according to a fourth embodiment will be described next.

The information processing system according to the fourth embodiment will be described below in conjunction with, mainly, points that are different from those of the second embodiment described above, and a description of similar points is not given hereinafter.

In the second embodiment described above, the condition for transmitting the update-difference data in descending order of priority is that the data transfer is not performed in time, as illustrated in operation S81 in the priority setting processing (in FIG. 17) performed by the priority setter 14*i*.

However, in the priority setting processing in the second embodiment, since the sections are identified from only the current mouse-cursor position information, the priority setting processing is executed even when the user happens to locate the mouse cursor in one section without intentional mouse operation.

Consequently, data for a section having a high degree of association with the mouse-cursor-located section is transmitted prior to data for the other sections. In practice, however, since the user may simply be viewing a section in which the update frequency is high, erroneous determination in the priority processing may occur. Accordingly, the information processing system according to the fourth embodiment reduces the amount of erroneous determination in the priority processing.

Figure 21:
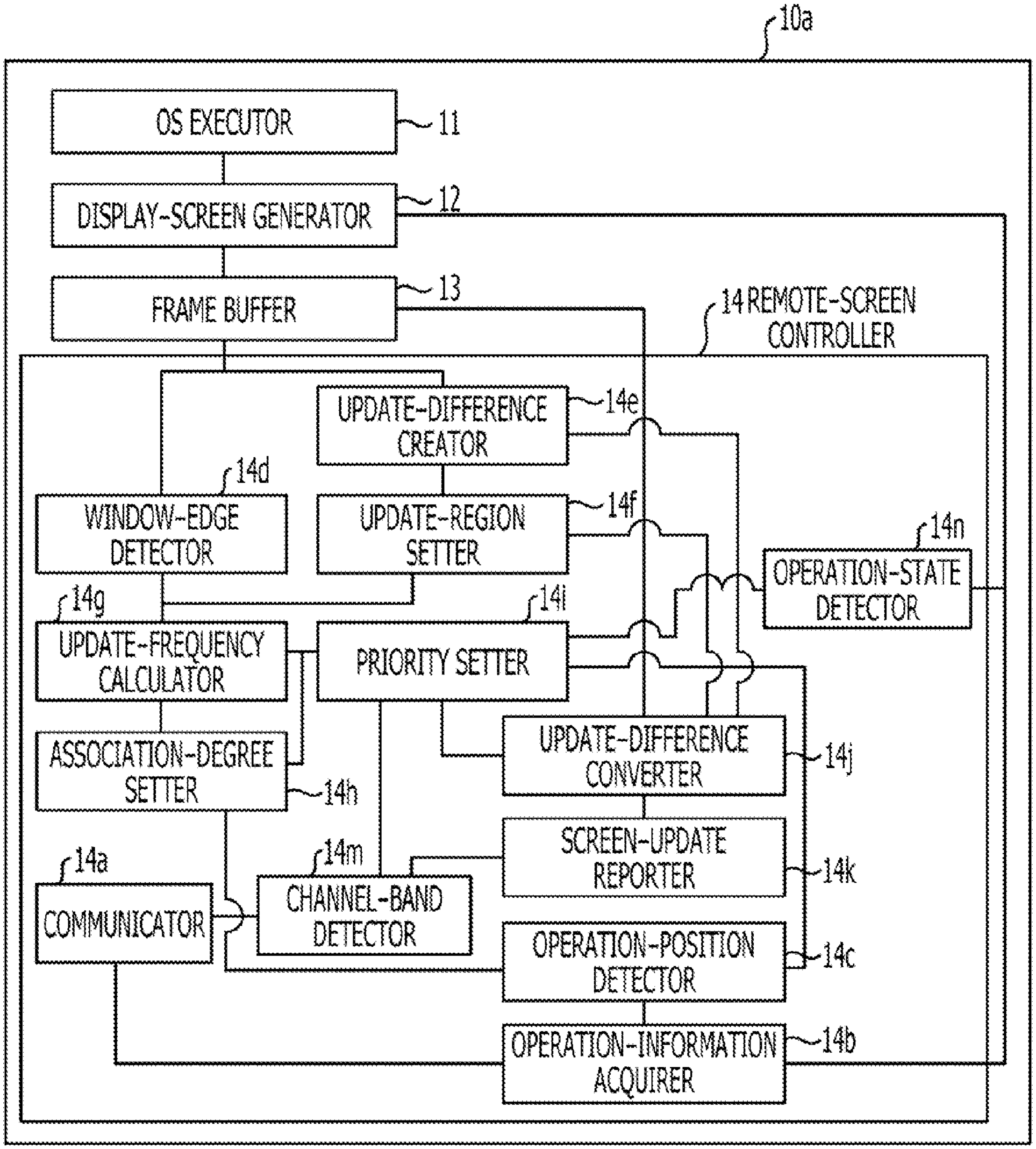
FIG. 21 is a block diagram illustrating a server apparatus in a fourth embodiment.

FIG. 21 is a block diagram illustrating a server apparatus in the fourth embodiment.

A server apparatus 10*a* in the present embodiment further includes an operation-state detector 14*n* for detecting an operation state.

The operation-state detector 14*n* obtains operation information from the operation-information acquirer 14*b*. The operation-state detector 14*n* then holds information indicating whether or not the user was performing an operation at a certain time and information indicating on which section the operation was performed when he or she was performing an operation.

On the basis of the information held by the operation-state detector 14*n*, the priority setter 14*i* sets priorities.

FIG. 22 illustrates the information held by the operation-state detector.

FIG. 22 illustrates a tabularized form of the information held by the operation-state detector 14*n*.

An operation-state management table T7 illustrated in FIG. 22 has a "time" column, a "tool operation state" column, and a "section" column. Pieces of information that are horizontally arranged are associated with each other.

In the "time" column, the time at which operation information that the operation-state detector 14*n* obtained from the operation-information acquirer 14*b* is contained.

In the "tool operation state" column, information indicating whether or not the user operated the mouse at a certain time. In the "tool operation state" column, "O" indicates that the mouse was operated and "x" indicates that the mouse was not operated.

In the "section" column, information that identifies the section on which an operation was performed when the user was operating the mouse is contained.

Priority setting processing in the fourth embodiment will be described next.

Figure 23:
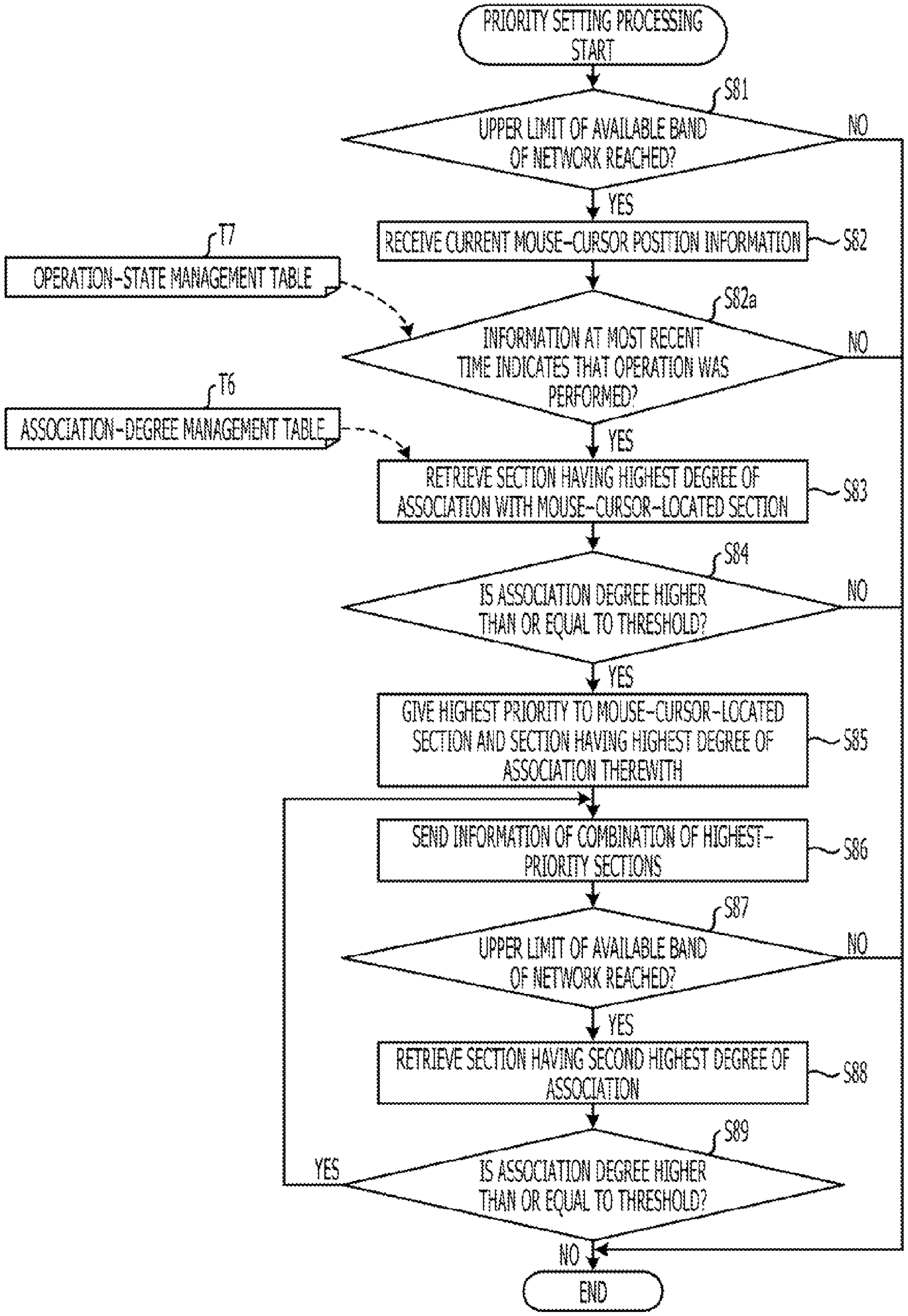
FIG. 23 is a flowchart illustrating priority setting processing in the fourth embodiment.

FIG. 23 is a flowchart illustrating priority setting processing in the fourth embodiment. Operations that are different from those in the second embodiment will be particularly described below.

In operation S82*a*, the priority setter 14*i* refers to the operation-state management table T7 to determine whether or not the information at the most recent time indicates that an operation was performed. When the information at the most recent time indicates that an operation was performed (Yes in operation S82*a*), the process proceeds to operation S83. When the information at the most recent time indicates that no operation was performed (No in operation S82*a*), the priority setting processing ends.

The information processing system according to the fourth embodiment provides substantially the same advantages as the information processing system according to the second embodiment. The information processing system according to the fourth embodiment can further reduce the amount of erroneous determination in the priority processing.

Fifth Embodiment

An information processing system according to a fifth embodiment will be described next.

The information processing system according to the fifth embodiment will be described below in conjunction with, mainly, points that are different from those of the second embodiment described above, and a description of similar points is not given hereinafter.

In the second embodiment described above, only the update frequencies of the sections are used to calculate the association degrees (refer to, for example, the association-degree calculation processing illustrated in FIG. 16). While the association degree is a value indicating that updates occurred at the same time, it is, more specifically, a value indicating that updates occurred at the same time when an operation was performed. Thus, when only the update frequencies are merely used to calculate the association degrees, the degree of association between two sections in which updates occur simultaneously by accident becomes relatively high. The server apparatus in the present embodiment utilizes operation history to enhance the reliability of the association degrees set by the association-degree setter 14*h*.

Figure 24:
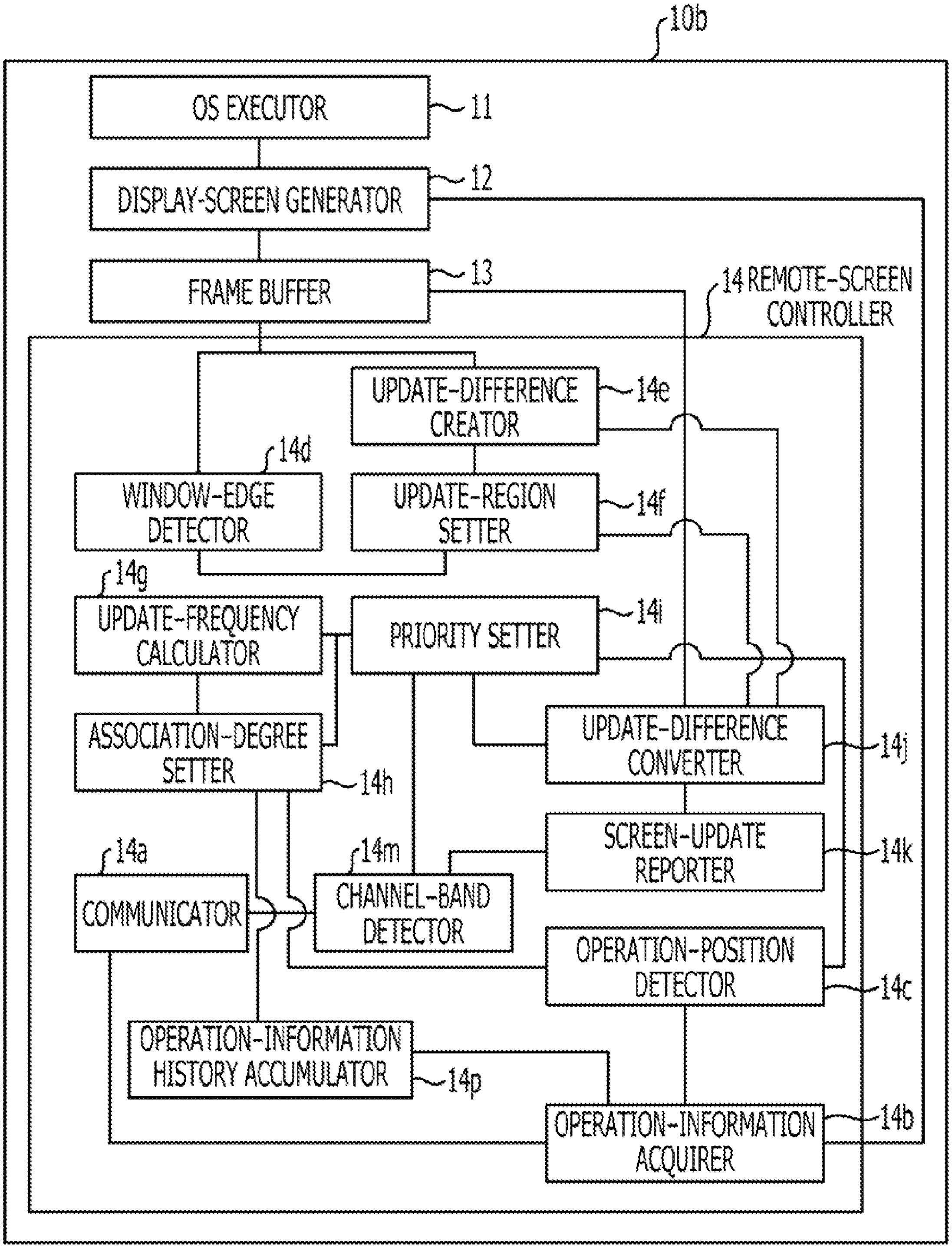
FIG. 24 is a block diagram illustrating a server apparatus in a fifth embodiment.

FIG. 24 is a block diagram illustrating a server apparatus in the fifth embodiment.

A server apparatus 10*b* in the present embodiment includes an operation-information history accumulator 14*p* having a function for accumulating the user's operation history, in addition to the configuration of the server apparatus 10, described above.

The operation-information history accumulator 14*p* accumulates, as history information, information indicating in which section an instruction operation (e.g., a click operation) to the mouse cursor position is performed for each unit time.

The association-degree setter 14*h* then sets association degrees on the basis of the accumulated history information.

FIG. 25 illustrates the history information held by the operation-information history accumulator.

FIG. 25 illustrates a tabularized form of the history information held by the operation-information history accumulator 14*p*.

An operation-information history management table T8 illustrated in FIG. 25 has a "time" column, a "section" column, and a "mouse position (x, y)" column. Pieces of information that are horizontally arranged are associated with each other.

In the "time" column, the time at which the operation-information history accumulator 14*p* obtains the mouse-cursor position information from the operation-position detector 14*c* is contained.

In the "section" column, information that identifies the number of times the mouse click operation is performed for each section is contained. The section information may be obtained from the window-edge detector 14*d*.

In the "mouse position" column, the mouse-cursor position information obtained from the operation-information acquirer 14*b* is contained.

Figure 26:
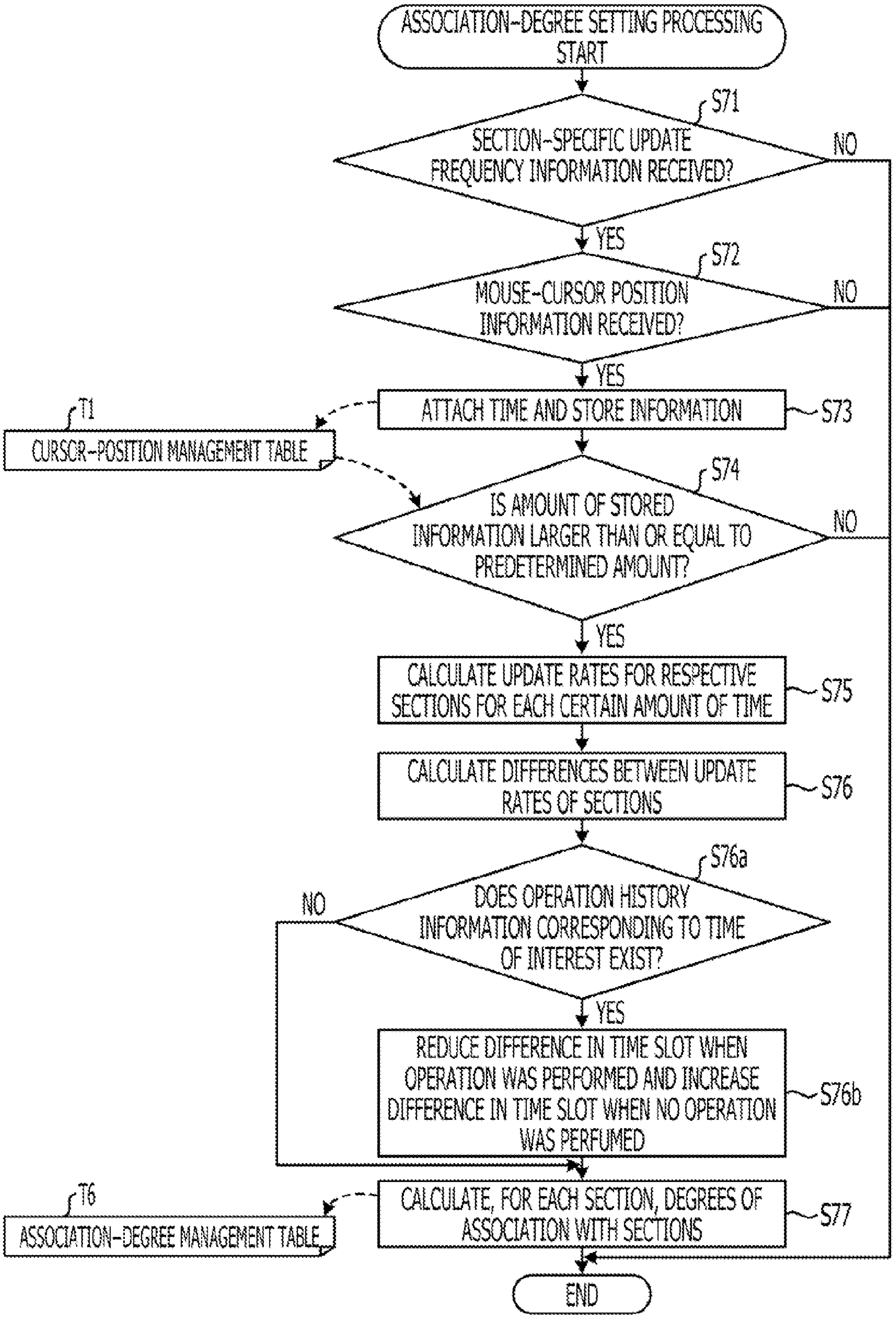
FIG. 26 is a flowchart illustrating association-degree setting processing in the fifth embodiment.

FIG. 26 is a flowchart illustrating association-degree setting processing in the fifth embodiment. Operations that are different from those in the second embodiment will be particularly described below.

In operation S76*a*, the association-degree setter 14*h* refers to the operation-information history management table T8 to determine whether or not operation history information corresponding to time of interest exists. When operation history information corresponding to the time of interest exists (Yes in operation S76*a*), the process proceeds to operation S76*b*. When no operation history information corresponding to the time of interest exists (No in operation S76*a*), the process proceeds to operation S77.

In operation S76*b*, the association-degree setter 14*h* sets an association degree by reducing the update-rate difference in a time slot when an operation was performed and increasing the update-rate difference in a time slot when no operation was perfumed. Thereafter, the process proceeds to operation S77.

Figure 27:
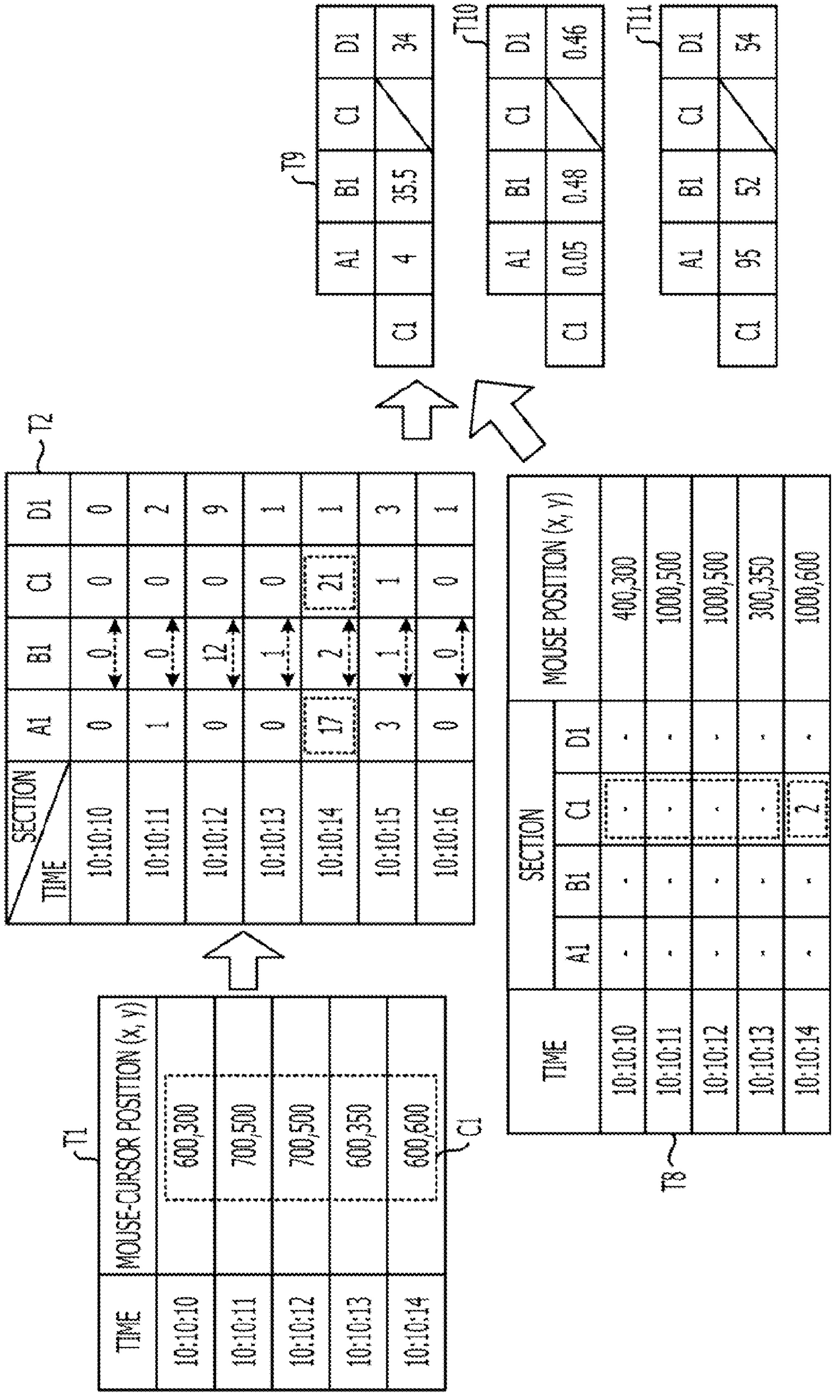
FIG. 27 illustrates a specific example of the association-degree setting processing in the fifth embodiment.

FIG. 27 illustrates a specific example of the association-degree setting processing in the fifth embodiment.

A cursor-position management table T1 and a table T2 illustrated in FIG. 27 are substantially the same as those illustrated in FIG. 18 and used in the description of the specific example of the second embodiment.

After calculating the update rates, the association-degree setter 14*h* uses the table T2 to calculate differences between the update rates for each of the update occurrence times at which operations were performed between the sections. Using the operation-information history management table T8, the association-degree setter 14*h* applies a weight to the update-rate differences.

FIG. 27 illustrates a table T9 that includes values obtained by applying a weight to the calculated update-rate differences. In the example illustrated in FIG. 27, the update-rate difference in the time slot when a mouse click operation was performed is reduced to one half and the update-rate difference in the time slot when no mouse click operation was performed is doubled.

For example, update rates of 0, 1, 0, 0, and 17 are obtained in the section A1 between time 10:10:10 and time 10:10:14 and update rates of 0, 0, 0, 0, and 21 are obtained in the section C1 between time 10:10:10 and time 10:10:14. Referring now to the operation-information history management table T8, the mouse cursor was operated twice in the section C1 at time 10:10:14. Thus, the update-rate difference at 10:10:14 is reduced to one half and the update-rate differences at the other times are doubled. As a result, the difference between the two update rates is calculated to be "4" (=$|0-0|+2\times|0-1|+|0-0|+|0-0|+1/2\times|21-17|$. This value "4" is used as an update-rate difference of the section A1 relative to the operation on the section C1. Similarly, an update-rate difference of the section B1 relative to the section C1 s determined to be 35.5 and an update-rate difference of the section D1 to the section C1 is determined to be 34. Since the method of the subsequent association-degree determination is substantially the same as the method in the second embodiment, a description thereof is not given hereinafter. A table T10 illustrated in FIG. 27 corresponds to the table T4 and a table T11 corresponds to the table T5. As illustrated in the table T11, the association degree of the section C1 relative to the section A1, the mouse cursor being operated in the section C1, is 95%, which is larger than the association degree "93%" of the section C1 relative to the section A1 in the case of the second embodiment.

The information processing system according to the fifth embodiment provides substantially the same advantages as the information processing system according to the second embodiment.

In addition, according to the information processing system of the fifth embodiment, a weight is further applied to thereby make it possible to further enhance the reliability of the association degrees set by the association-degree setter 14*h*.

Sixth Embodiment

An information processing system according to a sixth embodiment will be described next.

The information processing system according to the sixth embodiment will be described below in conjunction with, mainly, points that are different from those of the fifth embodiment described above, and a description of similar points is not given hereinafter.

The mouse is used to move the cursor across various points on the desktop. However, when a specific application is used, deviation occurs in the points between which the cursor is moved. For example, suppose a case in which, using a 3D CAD application, the user changes a setting for writing or the like while adjusting an overall shape of a 3D object in a data-rendering section by rotating the 3D object. In this case, a larger amount of mouse operation for moving the cursor between the data-rendering section in which the 3D object is rendered and an operation-tool section for setting the writing or the like may occur than usual.

Accordingly, in the server apparatus of the sixth embodiment, the deviation of the points between which the cursor is moved is reflected in the setting of the association degrees, to thereby enhance the reliability of the association degrees.

Figure 28:
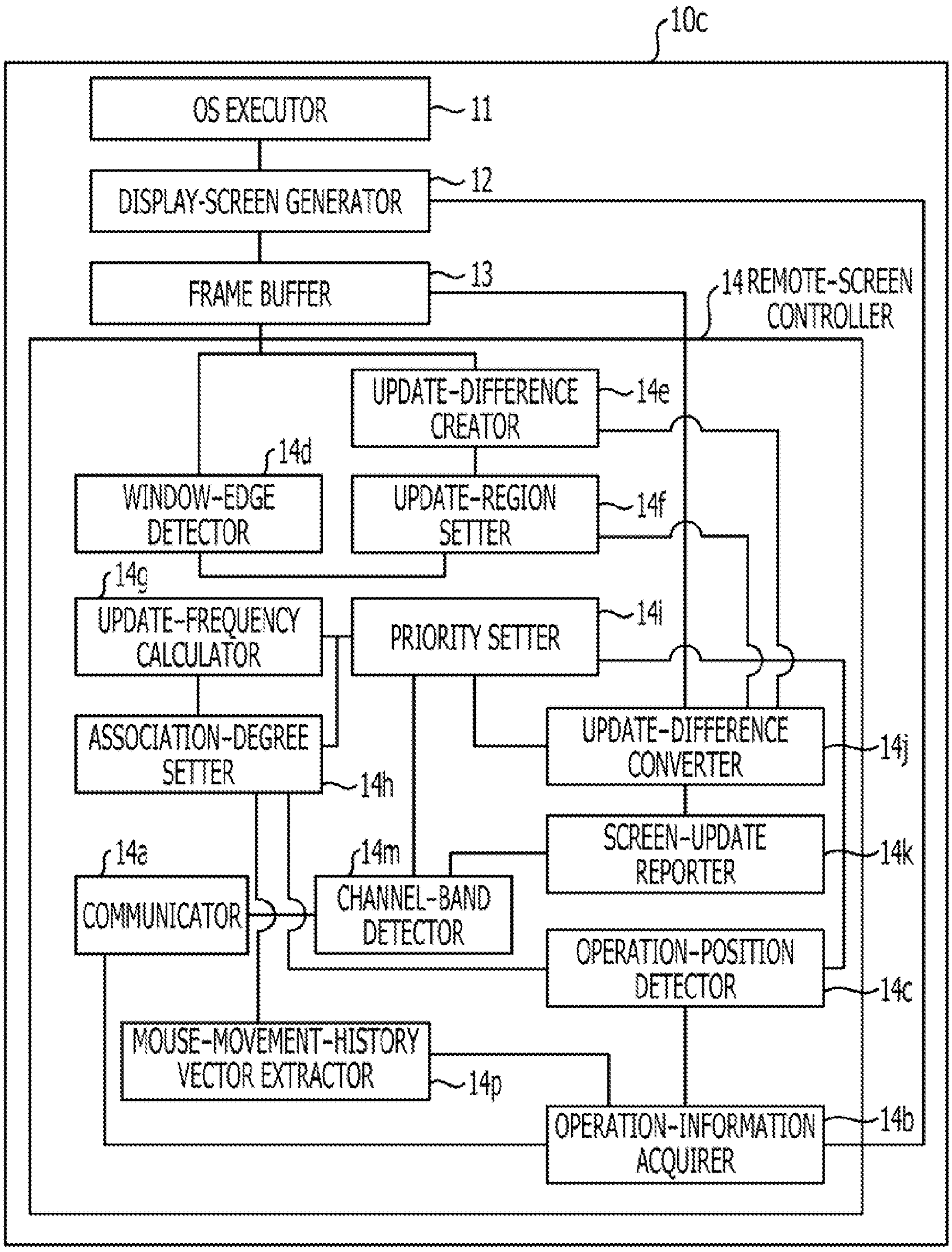
FIG. 28 is a block diagram illustrating a server apparatus in a sixth embodiment.

FIG. 28 is a block diagram illustrating a server apparatus in the sixth embodiment.

A server apparatus 10*c* in the present embodiment further has a mouse-movement-history vector extractor 14*q* having functions for generating information regarding a trace of mouse movement between multiple sections on the basis of the history information and accumulating the generated information.

FIG. 29 illustrates an operation of the association-degree setter in the sixth embodiment.

FIG. 29 illustrates a table T12 for managing information regarding the mouse-operation traces extracted by the mouse-movement-history vector extractor 14*q*.

In the table T12 illustrated in FIG. 29, information indicating from which section to which section a mouse operation is performed in a certain amount of time is contained. In the table T12, information indicating that a mouse operation for moving the cursor from the section C1 to the section A1 was performed ten times is contained.

On the basis of the table T12, the association-degree setter 14*h* increases, in the data of the association-degree management table T6, the degree of association of a corresponding section relative to a data-rendering section.

For example, a combination of sections between which a mouse operation was performed ten times or more in a certain amount of time is extracted. The table T12 illustrated in FIG. 29 indicates a case in which a mouse operation for moving the cursor from the section C1 to the section A1 and a mouse operation for moving the cursor from the section D1 to the section B1 are performed ten times or more in a certain period of time. Adjustment is performed so that the values in the association-degree management table T6 which correspond to the extracted combination are increased according to the number of times the operation was performed. As a result, in the association-degree management table T6 illustrated in FIG. 18, the value of the combination of the section C1 and the section A1 increases from 93 to 98 and the value of the combination of the section D1 and the section B1 increases from 89 to 93.

This operation allows for setting of more accurate association degrees.

Figure 30:
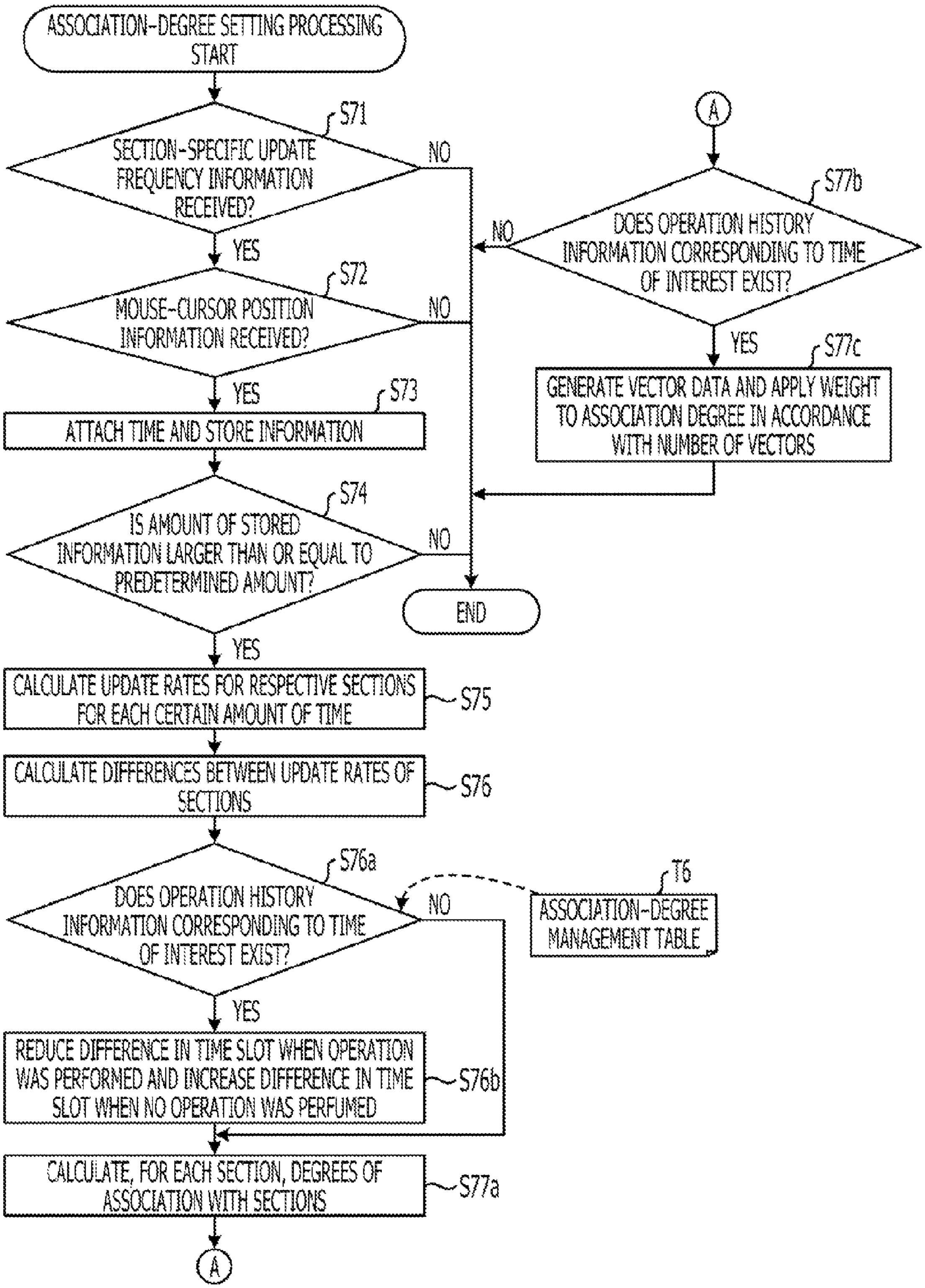
FIG. 30 is a flowchart illustrating association-degree setting processing in the sixth embodiment.

FIG. 30 is a flowchart illustrating association-degree setting processing in the sixth embodiment. Operations that are different from those in the fifth embodiment will be particularly described below.

In operation S77*a*, the association-degree setter 14*h* calculates, for each section, degrees of association with the sections. Thereafter, the process proceeds to operation S77*b*.

In operation S77*b*, the association-degree setter 14*h* refers to the operation-information history management table T8 to determine whether or not operation history information corresponding to time of interest exists. When operation history information corresponding to the time of interest exists (Yes in operation S77*b*), the process proceeds to operation S77*c*. When no operation history information corresponding to the time of interest exists (No in operation S77*b*), the processing ends.

In operation S77*c*, the association-degree setter 14*h* generates vector data on the basis of the operation history information. The association-degree setter 14*h* then applies a weight to the association degree in accordance with the number of vectors. Thereafter, the association-degree setting processing ends.

The description of the association-degree setting processing is finished at this point.

The information processing system according to the sixth embodiment provides substantially the same advantages as the information processing system according to the fifth embodiment.

In addition, according to the information processing system of the sixth embodiment, a weight is further applied to thereby make it possible to further enhance the reliability of the association degrees set by the association-degree setter 14*h*.

Although the information processing apparatus, the information processing method, and the information processing program according to the present invention have been described above in conjunction with the illustrated embodiments, the present invention is not limited thereto. The configurations of the units may be replaced with any elements having similar functions. Any other element or process may also be added to the present invention.

Additionally, in the present invention, two or more arbitrary elements (or features) in the above-described embodiments may also be combined together.

The above-described processing functions may be realized by a computer. In such a case, a program in which details of the processing functions of the information processing apparatus 1 and the server apparatus 10, 10*a*, 10*b*, or 10*c* are written is supplied. When the program is executed by the computer, the above-described processing functions are realized on the computer. The program in which the details of the processing are written may be recorded to a computer-readable recording medium. Examples of the computer-readable recording medium include a magnetic storage device, an optical disk, a magneto optical recording medium, and a semiconductor memory. Examples of the magnetic storage device include a hard disk drive, a flexible disk (FD), and a magnetic tape. Examples of the optical disk include a DVD, DVD-RAM, and CD-ROM/RW. One example of the magneto-optical recording medium is an MO (magneto-optical disk).

For distribution of the program, portable recording media (such as DVDs and CD-ROMs) on which the program is recorded may be made commercially available. The program may also be stored in a storage device in a server computer so that the program can be transferred therefrom to another computer over a network.

The computer that executes the program may store, in the storage device thereof, the program recorded on the portable recording medium or the like or transferred from the server computer. The computer then reads the program from the storage device thereof and executes processing according to the program. The computer may also directly read the program from the portable recording medium and execute the processing according to the program. In addition, each time the program is transferred from the server computer linked through a network, the computer may sequentially execute the processing according to the received program.

At least one of the above-described processing functions may also be implemented by an electronic circuit, such as a DSP (digital signal processor), an ASIC, or a PLD (programmable logic device).

Technologies disclosed in the above-described embodiments encompass the technologies described in appendices below.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A method implemented by a computer, the method comprising:

setting, by the computer, for respective sections set in an image to be transmitted, update frequencies of images stored in a storage unit for the sections in a predetermined period of time;

setting, by the computer, association degrees indicating degrees of association between the sections based on the update frequencies, wherein the association degrees are based on calculating an update rate for the respective sections for each certain amount of time in the predetermined period of time;

first determining, by the computer, whether history information corresponding to the each certain amount of time in the predetermined period of time exists;

applying, by the computer, a weight to the association degrees based on the history information when the history information exists based on the first determining;

second determining, by the computer, whether an amount of data transmitted reaches an upper limit of an available band of a network used for the image transmission;

identifying by the computer, a section on which an operation by a user is performed;

setting by the computer, a higher priority for the identified section and another section having a highest degree of association with the identified section than priorities for other sections only when the amount of data transmitted reaches an upper limit of an available band of a network used for the image transmission;

and transmitting by the computer, the image, stored in the storage unit, in sequence with the images stored for the sections whose set priority is higher first.

2. The method as claimed in claim 1, wherein the section on which an operation is performed is identified based on the section in which a cursor is located.

3. The method as claimed in claim 1, wherein when the association degree of the another section that is most highly associated with the identified section is higher than or equal to a threshold, a higher priority is set for the most highly associated section than priorities for the other sections.

4. The method as claimed in claim 2, further comprising:

storing a time at which the cursor is operated in conjunction with information regarding the cursor-located section, wherein the section on which an operation is performed is identified based on the time at which the cursor is operated.

5. The method as claimed in claim 1, further comprising:

setting an update region in which a number of updates is larger than or equal to a certain value by comparing given frames of images with each other, wherein the update frequencies is set based on the set update region and the set sections.

6. The method as claimed in claim 1, wherein the sections are set by detecting edges of windows in the image to be transmitted.

7. The method as claimed in claim 6, wherein the section is changed after the edges are detected based on the association degrees set.

8. The method as claimed in claim 7, wherein a number of sections to be set is increased when all of the association degrees are lower than or equal to a threshold.

9. The method as claimed in claim 7, wherein a section whose degrees of association with all of the other sections are smaller than or equal to a threshold is excluded from the sections to be set.

10. A non-transitory computer-readable recording medium that stores a program for causing a computer to execute processing comprising:

setting, for respective sections set in an image to be transmitted, update frequencies of images stored in a storage unit for the sections in a predetermined period of time;

setting association degrees indicating degrees of association between the sections based on the update frequencies, wherein the association degrees are based on calculating an update rate for the respective sections for each certain amount of time in the predetermined period of time;

first determining whether history information corresponding to the each certain amount of time in the predetermined period of time exists;

applying a weight to the association degrees based on the history information when the history information exists based on the first determining;

second determining whether an amount of data transmitted reaches an upper limit in an available band of a network used for the image transmission;

identifying a section on which an operation by a user is performed and setting a higher priority for the identified section and another section having a highest degree of association with the identified section than priorities for other sections, only when the amount of data transmitted reaches an upper limit of an available band of a network used for the image transmission;

and transmitting the image, stored in the storage unit, in sequence with the images stored for the sections whose set priority is higher first.

11. A system comprising:

processing circuitry configured to set, for respective sections set in an image to be transmitted, update frequencies of images stored in a memory for the sections in a predetermined period of time;

set association degrees indicating degrees of association between the sections based on the update frequencies, wherein the association degrees are based on calculating an update rate for the respective sections for each certain amount of time in the predetermined period of time;

first determine whether history information corresponding to the each certain amount of time in the predetermined period of time exists;

apply a weight to the association degrees based on the history information when the history information exists based on the first determining;

second determine whether an amount of data transmitted reaches an upper limit in an available band of a network used for the image transmission;

identify a section on which an operation by a user is performed; and set a higher priority for the identified section and another section having a highest degree of association with the identified section than priorities for other sections only when the amount of data transmitted reaches an upper limit of an available band of a network used for the image transmission; and communication interface circuitry configured to transmit the image, stored in the memory, in sequence with the images stored for the sections whose set priority is higher first.

* * * * *